(12) United States Patent
Murata

(10) Patent No.: US 6,257,058 B1
(45) Date of Patent: Jul. 10, 2001

(54) SILICON GYROSCOPE AND METHOD OF DRIVING THE SAME

(75) Inventor: Shinji Murata, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/298,746

(22) Filed: Apr. 23, 1999

(30) Foreign Application Priority Data

Apr. 27, 1998 (JP) .................................................. 10-117308
Sep. 14, 1998 (JP) .................................................. 10-260392

(51) Int. Cl.⁷ .................................................. G01P 9/04
(52) U.S. Cl. .................................... 73/504.16; 310/370
(58) Field of Search .......................... 73/504.12, 504.14, 73/504.15, 504.16, 504.04, 504.02, 514.32; 310/370, 321

(56) References Cited

U.S. PATENT DOCUMENTS

| | | |
|---|---|---|
| 4,598,585 | 7/1986 | Boxenhorn . |
| 5,451,828 | 9/1995 | Tomikawa et al. . |
| 5,461,916 * | 10/1995 | Fujii et al. .......................... 73/504.15 |
| 5,691,595 * | 11/1997 | Tomikawa et al. .................... 310/370 |
| 5,708,320 * | 1/1998 | Ohnishi et al. ....................... 310/370 |
| 5,756,895 * | 5/1998 | Kubena et al. .................... 73/504.15 |
| 5,824,900 * | 10/1998 | Konno et al. ...................... 73/504.16 |
| 5,861,705 * | 1/1999 | Wakatsuki et al. ............... 73/504.16 |
| 6,003,372 * | 12/1999 | Kawakami et al. ............... 73/504.15 |

* cited by examiner

Primary Examiner—Helen Kwok
(74) Attorney, Agent, or Firm—Brinks Hofer Gilson & Lione

(57) ABSTRACT

A silicon gyroscope comprises a vibrator 1 which is made from a silicon wafer and has three elastic arms 2 separated by two notches, with part of the root section of vibrator which supports the elastic arms being fixed to a base plate 3, horizontal electrodes 4 which are laid between the elastic arms and on the outer sides of the elastic arms by being orthogonal to the plane of layout of the elastic arms and close to the elastic arms, and vertical electrodes 5 which are laid in correspondence to the elastic arms by being parallel to the arm layout plane and close to the elastic arms. The silicon gyroscope which is driven in innovative manner is capable of stably detecting the angular velocity.

4 Claims, 23 Drawing Sheets

(UNIT: μm)

(UNIT: μm)

SILICON GYROSCOPE AND METHOD OF DRIVING THE SAME

BACKGROUND OF THE INVENTION

1. Field of the Invention

The present invention relates to a silicon gyroscope for detecting the rotatory angular velocity based on the Coriolis force which arises when the vibrator of the gyroscope turns while vibrating, and also relates to a method of driving the silicon gyroscope. Particularly, the invention relates to a silicon gyroscope which is capable of stably detecting the angular velocity and a silicon gyroscope which has enhanced sensitivity without the need of supply of a high drive voltage, and also relates to a method of driving the silicon gyroscopes.

2. Description of the Prior Art

There has been developed recently a compact vibratory gyroscope for use in a navigation system equipped on motor vehicles, an attitude controller of unmanned vehicles, and a field swing preventive device of video cameras. This vibratory gyroscope consists of a vibrator having three parallel elastic arms separated by two notches, a drive means for vibrating the elastic arms, and a means of detecting the vibration component which is orthogonal to the direction of vibration of the elastic arms resulting from the turning of the vibrator. The vibrator of the gyroscope is made of piezoelectric ceramics or constant elasticity metal (elinvar).

The vibrator of piezoelectric ceramics necessitates only the formation of electrodes for current conduction by basing the operation on its own piezoelectricity, and it can be simple in structure. However, piezoelectric ceramics generally has a small Q value of vibration (ranging from 20 to 1000). Therefore, it cannot be expected to have a large resonance-based displacement amplification effect. It also has drawbacks of the need of large input energy and the heating caused by the large input energy.

The piezoelectric ceramics material also has a large temperature-dependent variation of Young's modulus (ranging from 10 to 200 ppm) and a large linear expansion coefficient (ranging from 10 to 50 ppm). On this account, the vibrator of piezoelectric ceramics varies in its dimensions in response to the variation of environmental temperature, resulting possibly in a sensor output variation. It also suffers from the temperature dependence of piezoelectricity (ranging from 100 to 5000 ppm) and thus can have output fluctuation in response to the variation of environmental temperature even in the absence of variation of dimensions.

Moreover, the piezoelectric sensor heats up by itself, and therefore it is liable to have output fluctuation during the period after it is turned on until it reaches the steady state temperature even at a constant environmental temperature. For example, for a gyroscope sensor which bases the azimuth detection on the integration of angular velocity output, a fluctuation of null value of the output results in an error of detected azimuth.

In the case of a vibrator formed of constant elasticity metal, piezoelectric elements are glued to the elastic arms and energized so that the arms vibrate, causing the whole vibrator of constant elasticity metal to vibrate. This vibrator is more complex in structure than the vibrator of piezoelectric ceramics mentioned previously.

FIG. 35 is a perspective view of a vibrator of a conventional gyroscope made from constant elasticity metal, and FIG. 36 is a cross-sectional view of the vibrator arm. The vibrator 200 has elastic arms 201a, 201b and 201c which extend in parallel to each other, on which are glued piezoelectric elements 202a–202l, with electrodes 203a–203l for current conduction being formed thereon.

The vibrator of constant elasticity metal, with the piezoelectric elements 202 being glued thereon, has problems similar to the above-mentioned problems inherent to piezoelectric ceramics, and further has a problem of the divergence of resonant frequencies of drive and detection caused by the distortion of vibrator 200 due to different thermal expansion coefficients of different materials glued together, a problem of output fluctuation caused by the variation of vibration amplitude of the vibrator 200, a problem of the influence of vibration of the vibrator 200 when there is a gap between the piezoelectric element 202 and the vibrator 200, and a problem of the influence on the output signal attributable to the Coriolis force.

In regard to the conventional drive method for the silicon gyroscope, a voltage is applied between the vibrator and the driving electrodes in the vibrator drive direction so that the vibrator is driven by the electrostatic force, and the value of displacement of the vibrator caused by the Coriolis force is detected in terms of the variation of static capacitance between the vibrator and the detecting electrodes.

However, this conventional drive method not only needs to deal with a small static capacitance (0.1 to 3 pF) in a quiescent state, but also an extremely small variation of static capacitance (5 to 500 aF) arising in response to a displacement of vibrator caused by the Coriolis force. In addition, a C-V conversion circuit which converts the static capacitance into a voltage value is extremely susceptible to external noises attributable to electromagnetic induction or the like due to a high input impedance of the circuit. Moreover, due to the device structure in which the driving electrodes and detecting electrodes are located closely on the vibrator, it is difficult to prevent the induction noise created by the driving electrodes from leaking to the high-impedance detecting electrodes.

The static capacitance varies in response to the Coriolis force at the same frequency as driving of the vibrator, making it difficult to separate the signal from noise and thus causing the C-V conversion circuit to have a smaller gain, resulting in a smaller sensitivity of detection of angular velocity.

The conventional drive method bases the flexure of vibrator on the expansion and contraction of piezoelectric element, and therefore the vibrator is liable to twist in the motion of drive vibration due to the unevenness of piezoelectric material. Similarly, at detection, the displacement of vibrator created by the Coriolis force in the direction orthogonal to the direction of drive vibration fluctuates. Error of orthogonality between the vibration direction of drive and the vibration direction of detection creates a mechanical coupling of the driving signal with the vibration of detection, and affects the output signal, resulting in a drift or offset of the output signal.

From the foregoing viewpoints, the conventional gyroscope and the associated drive method are deficient seriously in implementing the stable detection of angular velocity.

SUMMARY OF THE INVENTION

It is an object of the present invention to provide a silicon gyroscope and a method of driving the same which are capable of stably detecting the angular velocity.

Specifically, the inventive silicon gyroscope comprises a vibrator which is made from a silicon wafer and has three elastic arms separated by two notches, with part of the root section of the vibrator which supports the elastic arms being fixed to a base plate, horizontal electrodes which are laid between the elastic arms and on the outer sides of the elastic arms by being orthogonal to the plane of layout of the elastic arms and close to the elastic arms, and vertical electrodes which are laid in correspondence to the elastic arms by being parallel to the arm layout plane and close to the elastic arms.

In the inventive silicon gyroscope, the horizontal electrodes are made from a silicon wafer, the vertical electrodes are made from a metallic film, and the base plate is a glass plate, on which the horizontal electrodes and the vertical electrodes are formed. The vertical electrode for each elastic arm consists of two electrodes, to which are applied voltages of opposite polarities.

In regard to this object of the invention, the vibrator is formed of monocrystalline silicon so that a large Q value (ranging from 1000 to 20000) is obtained, thereby producing a stable output throughout the long-term use in the environment of varying temperature. Moreover, in regard to this object of the invention, the vibrator is rid of attached members of different material so that the vibration of vibrator is free from their influence. Silicon has as small thermal expansion coefficient as 2 ppm, which less affects the resonant frequency, and in the case of employing a self oscillation circuit, it varies the oscillation frequency in response to the expansion and contraction of the vibrator, thereby retaining the resonant state.

Another object of the present invention is to provide a silicon gyroscope which has enhanced sensitivity without the need of supply of a high drive voltage based on the reduction of distance between elastic arms, and yet which is inexpensive. Specifically, the inventive silicon gyroscope comprises a vibrator which is made from a silicon wafer and has three elastic arms separated by two notches, with part of the root section of vibrator which supports the elastic arms being fixed to a base plate, and vertical electrodes which are laid in correspondence to the elastic arms by being parallel to the plane of layout of the elastic arms and close to the elastic arms, wherein the elastic arms are dimensioned to have a thickness d and a notch width W related in terms of the value of W/d to be in the range from 1 to 0.02.

In the inventive silicon gyroscope, the vertical electrodes are designed to consist of driving electrodes provided in correspondence to individual elastic arms and Coriolis force detecting electrodes which confront the notches and the outer sides of the elastic arms, horizontal electrodes are laid on the outer sides of the elastic arms by being orthogonal to the direction of layout of the elastic arms and close to the elastic arms, the driving electrodes are designed to consist of two electrodes, and a drive-synchronous electrode for detecting a Coriolis force in the vertical direction is formed between the two driving electrodes.

In regard to this object of the invention, horizontal electrodes which are laid between the elastic arms originally are eliminated thereby to reduce the distance between the elastic arms so that a large Q value (ranging from 1000 to several tens thousands) is obtained. Moreover, in regard to this object of the invention, the Coriolis force in the horizontal direction is detected based on the detection of the variation of the coincidence factor between the elastic arm and Coriolis force detecting electrode, with the accuracy of horizontal Coriolis force detection being enhanced by the provision of the horizontal electrodes on the outer sides of the elastic arms. Moreover, in regard to this object of the invention, the driving electrodes are used to detect the vibration of vertical direction of the vibrator.

Still another object of the present invention is to provide a method of driving a silicon gyroscope which includes two vertical electrodes or driving electrodes laid in correspondence to elastic arms of a vibrator, with voltages including d.c. components of opposite polarities and a.c. components of opposite phases being applied in pairs to the two vertical electrodes or driving electrodes.

In regard to this object of the invention, the mutual influence of electrodes are cancelled by the application of d.c. components of opposite polarities and a.c. components of opposite phases to the respective electrodes, thereby improving significantly the sensitivity of detection of angular velocity.

DESCRIPTION OF THE PREFERRED EMBODIMENTS

Embodiments of the present invention will be explained with reference to the drawings.

Figure 1:
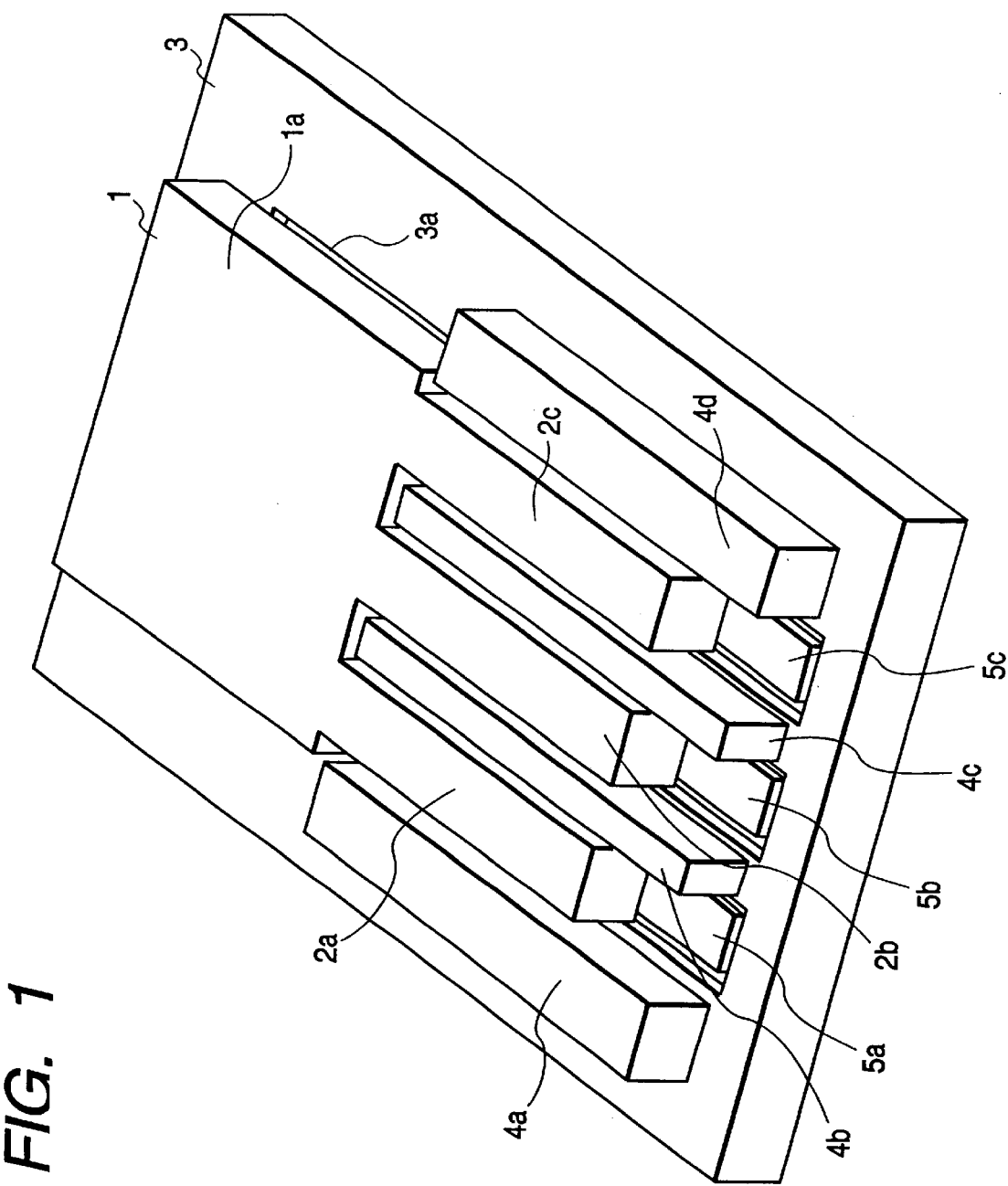
FIG. 1 is a perspective view of a silicon gyroscope based on a first embodiment of this invention.
Figure 2:
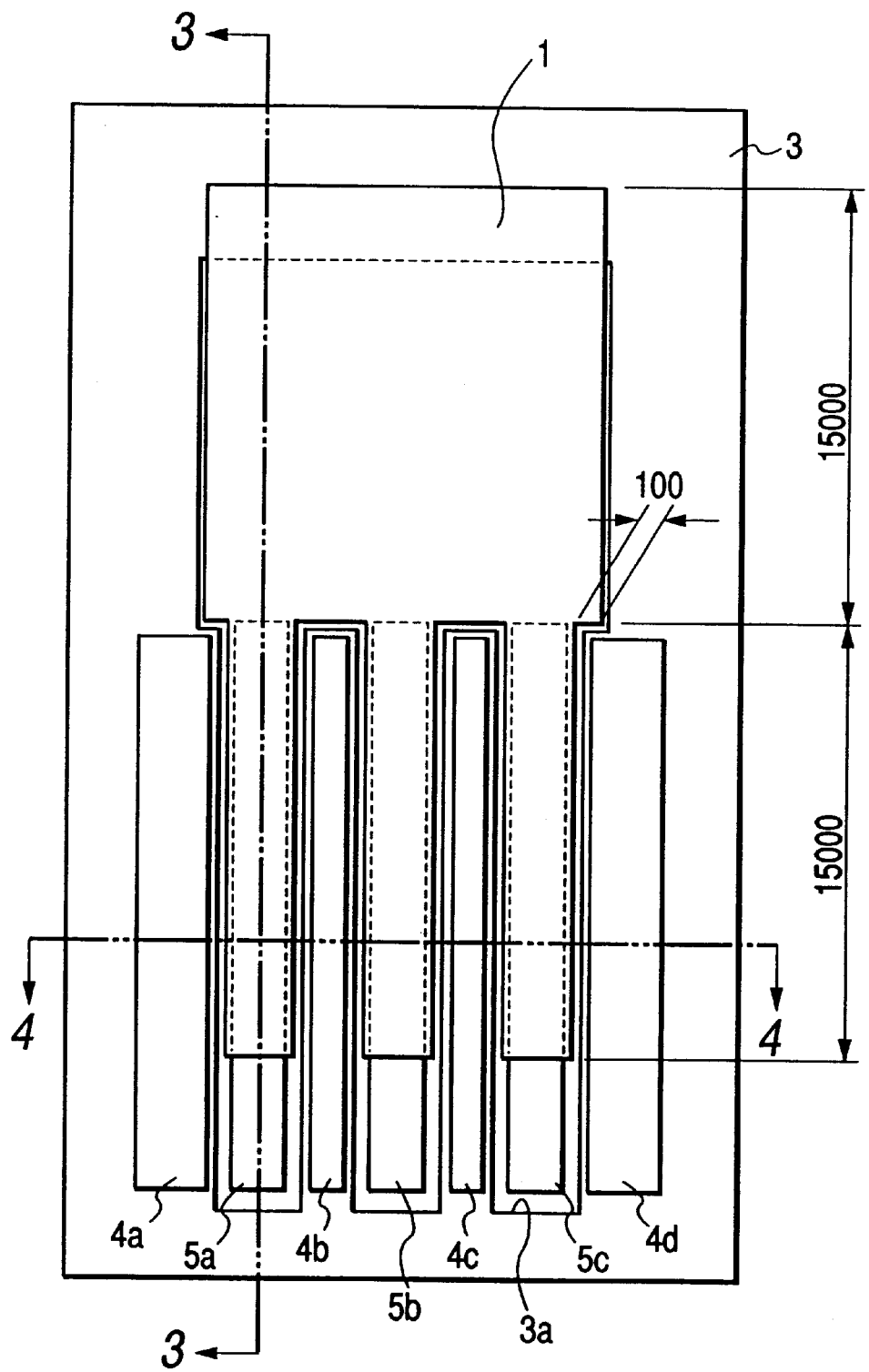
FIG. 2 is a plan view of the silicon gyroscope shown in FIG. 1.

The main body of silicon gyroscope of the first embodiment shown in FIG. 1 and FIG. 2 is made up of a vibrator 1, a base plate 3, horizontal electrodes 4, and vertical electrodes 5. The vibrator 1 which is made of silicon consists of a root section 1a and three elastic arms 2a, 2b and 2c which are parallel to each other and separated by two notches running from the root section 1a. The vibrator 1 is joined at its end of root section 1a to the base plate 3 of glass by means of anode plate bonding technique or the like.

The horizontal electrodes 4 of this embodiment are made of silicon, and are laid between the individual elastic arms 2a,2b and 2c and on the outer sides of the elastic arms 2a and 2c by being orthogonal and close to these arms. The individual horizontal electrodes 4a,4b,4c and 4d are formed on the base plate 3.

The vertical electrodes 5 of this invention is made of chrome, and the individual vertical electrodes 5a,5b and 5c are laid in grooves 3a, which are formed on the upper surface of the base plate 3, by being parallel to the direction of layout of the elastic arms 2a,2b and 2c and close to the arms.

The vibrator 1 is adapted to vibrate at its elastic arms 2a,2b and 2c by being secured at its root section 1a. The vibration of the elastic arms 2a,2b and 2c propagated to the root section 1a is so weak that it does not virtually cause the end of root section 1a to vibrate. According to this invention, the end of root section 1a is joined to the base plate 3 so that it does not affect the vibration of the elastic arms 2a,2b and 2c.

Figure 3:
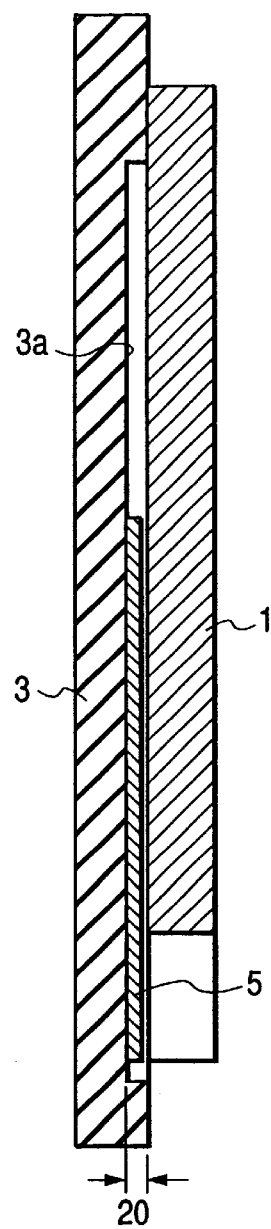
FIG. 3 is a cross-sectional view taken along the line 3—3 of FIG. 2.
Figure 4:
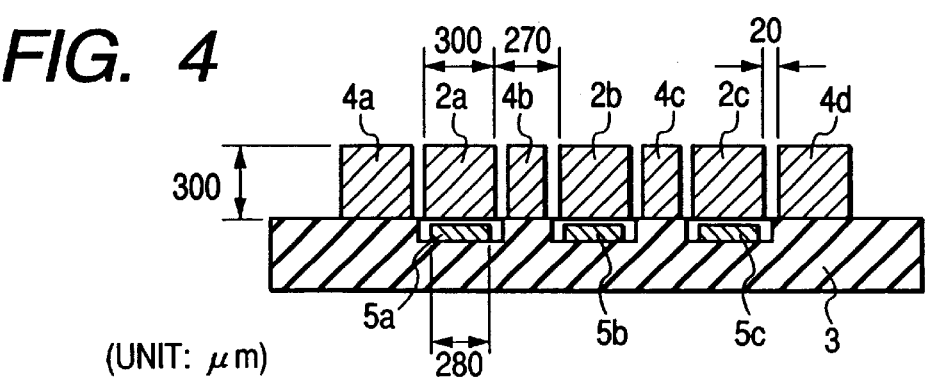
FIG. 4 is a cross-sectional view taken along the line 4—4 of FIG. 2.

FIG. 2 shows by a plan view the dimensions of the vibrator 1 shown in FIG. 1. The vibrator 1 fabricated to have these dimensions operates at a resonant frequency of about 2 kHz. FIG. 3 and FIG. 4 are cross-sectional views taken along the line 3—3 and line 4—4, respectively, of FIG. 2.

As shown in these figures, the vertical electrodes 5 and horizontal electrodes 4 of this embodiment are laid in the orthogonal directions. The vibrator 1 can vibrate freely in the vertical and horizontal directions, so that it vibrates without twisting by being driven in the horizontal or vertical direction, allowing the detection of only the displacement component orthogonal to the drive direction caused by the Coriolis force acting on the vibrator 1 in the direction orthogonal to the drive direction.

The vibrator 1 of this embodiment is made of monocrystal silicon having little defects of lattice, so that there is no distortion in it and it has superior thermal characteristics. The vibrator 1 is designed to operate entirely in non-contact manner for driving and angular velocity detection, and it has no additional members attached which can affect the vibration of vibrator 1, thereby enabling the stable detection of angular velocity.

The material of the vibrator 1 is high-purity monocrystal silicon, allowing it to have a large Q value (ranging from 1000 to 20000). In addition, because of extremely little defects of lattice included in the material, the vibrator 1 is free from the vibration-caused fatigue, the plastic deformation even under the large-amplitude vibration, and the holding of distortion and internal stress in the silicon material, whereby it can produce a stable output throughout the long-term use in the environment of varying temperature.

The vibrator 1 of the inventive silicon gyroscope has no attachment of different material, allowing itself to vibrate stably without being affected by other members, and it is free from the creation of gaps which would occur at the formation of piezoelectric elements or electrodes on the vibrator 1 and free from the exertion of a distortion or stress to it. The vibrator 1 is free from the distortion attributable to different thermal expansion coefficients of different materials, and free from the influence of temperature variation associated with the different materials.

Silicon has as small thermal expansion coefficient as 2 ppm, which less affects the resonant frequency as compared with piezoelectric elements. In the case of employing a self oscillation circuit, it varies the oscillation frequency in response to the expansion and contraction of the vibrator 1, thereby retaining the resonant state.

The vibrator 1 of silicon can be fabricated precisely on a mass-production scale based on the photolithography. The resulting accurate orthogonality minimizes the influence of the drive vibration on the vibration of detection, and eventually prevents the influence on the output signal.

Figure 5:
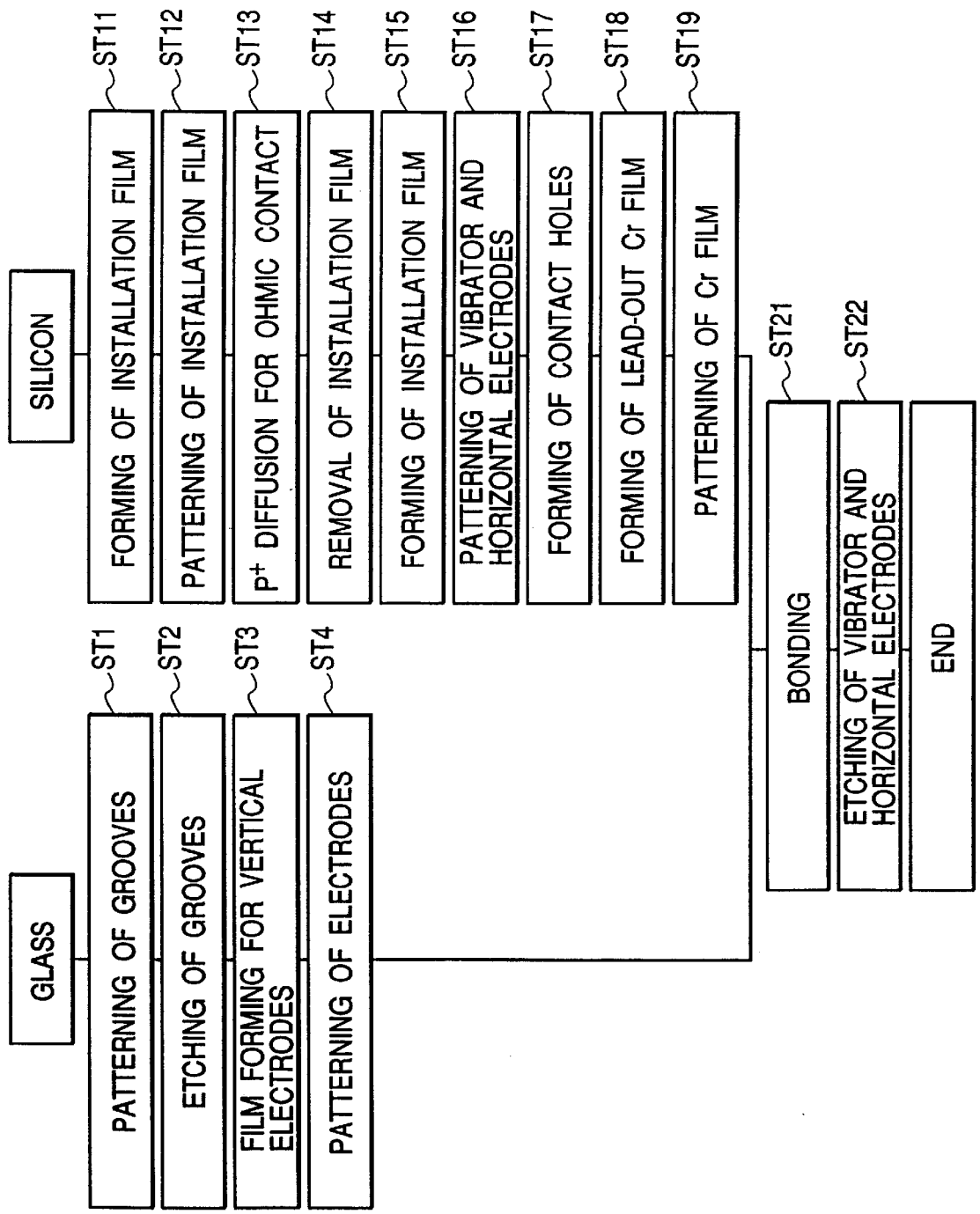
FIG. 5 is a flowchart showing the fabrication process of the silicon gyroscope shown in FIG. 1.

FIG. 5 shows by a flowchart the fabricating process of the inventive silicon gyroscope. The process consists of four major stages, which are a process of a glass plate which will become the base plate 3, a process of silicon which will become the vibrator 1, a process of joining the vibrator 1 to the base plate 3, and a process of the vibrator 1.

A glass plate for the base plate 3 is rendered the patterning of step ST1 and the subsequent etching of step ST2 for forming grooves 3a on the upper surface of the glass plate, so that a gap of about 20 pm is created between the vibrator 1 and the bottom of grooves 3a.

Subsequently, a chrome film of about 0.5-μm thickness is formed by sputtering in step ST3 and next patterned in step ST4, so that the vertical electrodes 5 of the intended shape are formed on the bottom of grooves 3a.

In the silicon process, an insulation film is formed on the entire surface of a silicon wafer in step ST11, and it is patterned for diffusion in step ST12 and rendered the diffusion of B (boron) for ohmic contact in step ST13. The position of ohmic contact on the root section 1a is selected to be above the joint section against the glass base plate 3 so that it does not affect the vibration of vibrator 1.

Subsequently, the insulation film is removed in step ST14, another insulation film which serves for the mask in forming the vibrator 1 and horizontal electrodes 4 is formed in step ST15, and it is patterned in step ST16. Next, contact holes for a signal lead-out Cr film is formed in step ST17, the signal lead-out Cr film is formed in step ST18, and it is patterned to leave only the electrode section in step ST19.

The resulting silicon member is joined to the glass base plate 3 by use of anode plate bonding technique in step ST21. Subsequently, notches for separation are formed by etching in step ST22 for the formation of the vibrator 1 and horizontal electrodes 4.

Finally, the insulation film is removed, the wafer is divided into chips of a certain size by means of a dicer or the like, and the chips are planted and wired by bonding or the like on circuit boards, although these processes are not shown on the flowchart of FIG. 5.

Figure 6:
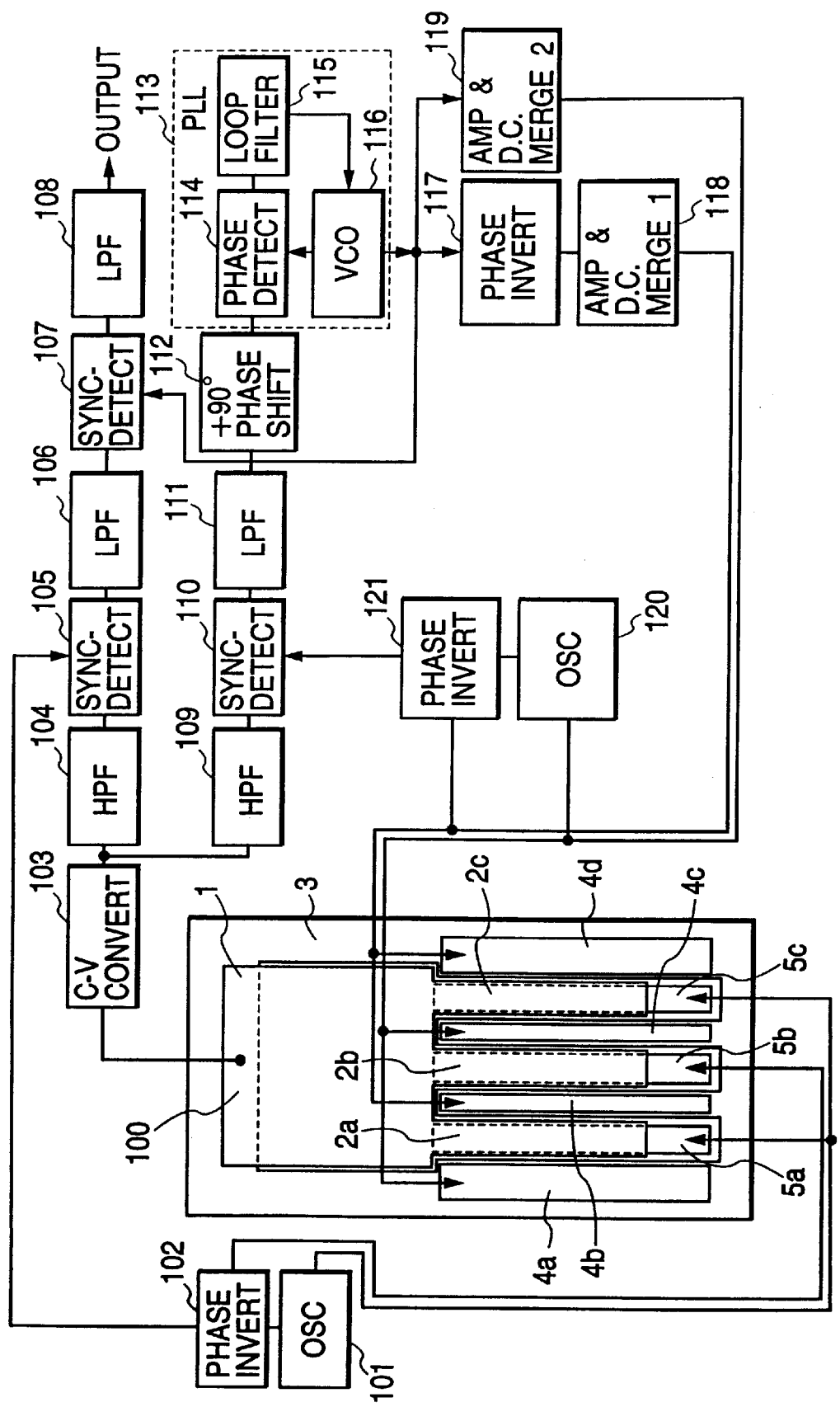
FIG. 6 is a block diagram of the drive/detect circuit of the silicon gyroscope of the first embodiment.

FIG. 6 shows by a block diagram the circuit arrangement for driving and detection of the silicon gyroscope of the first embodiment. An oscillation circuit 101 generates an alternating voltage having a frequency of 50 kHz and amplitude of 5 volts, and the voltage is applied to the vertical electrodes 5a and 5c that confront the outer elastic arms 2a and 2c of the vibrator 1. A phase inverting circuit 102 produces a carrier wave of opposite phase relative to the voltage provided by the oscillation circuit 101, and it is applied to the vertical electrode 5b which confronts the middle arm 2b.

The vertical electrodes 5a, 5b and 5c are spaced out with a gap of 20 μm from the elastic arms 2a,2b and 2c, respectively, of the vibrator 1, so that a static capacitance emerges across the gaps, which is converted into a voltage value by a C-V conversion circuit 103.

The C-V conversion circuit 103 has its output fed through a high-pass filter (HPF) 104 having a cutoff frequency of 10 kHz so that the induction noise of 2 kHz caused by electrostatic driving is eliminated. The resulting voltage signal is fed to a synchronous detection circuit 105, which implements the synchronous detection for the signal based on the frequency and phase of the oscillation circuit (oscillator) 101. The detection output is fed through a low-pass filter (LPF) 106, with its output representing the variation of static capacitance between the three elastic arms 2a, 2b and 2c of the vibrator 1 and the vertical electrodes 5a, 5b and 5c in their vertical direction.

The vibrator 1 which is made of low-resistivity silicon is conceived to be electrically conductive for the alternating voltage with respect to the impedance component of the static capacitance between the elastic arms 2a,2b and 2c of the vibrator 1 and the vertical electrodes 5a,5b and 5c. Accordingly, the capacitance variations of the three elastic arms 2a,2b and 2c are coupled at the signal lead-out section 100 and fed by being summed to the C-V conversion circuit 103.

Among the horizontal electrodes 4a,4b,4c and 4d, the electrodes 4a and 4c that are in jumper connection and the electrodes 4b and 4d that are in jumper connection are connected to an oscillation circuit 120 and a phase inverting circuit 121, respectively, by way of d.c. component cutting capacitors and voltage dividing resistors (not shown). The oscillation circuit 120 generates a voltage having a frequency of 70 kHz and amplitude of 5 volts.

Due to the spacing with a 20-μm gap between the horizontal electrodes 4a,4b,4c and 4d and the three elastic arms 2a,2b and 2c of vibrator, there emerge the static capacitance across the gaps, which is converted into a voltage value by the C-V conversion circuit 103.

The C-V conversion circuit 103 has its output fed through a HPF 109 having a cutoff frequency of 10 kHz, and subsequently rendered the synchronous detection by a synchronous detection circuit 110 based on the frequency and phase of the oscillation circuit (oscillator) 120. The detection output is fed through a LPF 111, with its output representing the variation of static capacitance between the horizontal electrodes 4a, 4b, 4c and 4d and the three elastic arms 2a,2b and 2c of the vibrator 1 in their horizontal direction. The paired horizontal electrodes 4a and 4c and 4b and 4d are connected to amplify/d.c. merge circuits 118 and 119, respectively, by way of voltage dividing resistors (not shown).

The LPF 111 has its output fed through a +90° phase shift circuit 112 and a PLL circuit 113, which is made up of a voltage-controlled oscillator (VCO) 116, a phase detection circuit 114 which compares the vibration phase of the vibrator with the oscillation phase of the VCO 116, and a loop filter 115. The PLL circuit 113 has its output amplified by the amplify/d.c. merge circuits 118 and 119, by which a d.c. voltage is superimposed, and consequently there emerges an electrostatic attraction force between the elastic arms 2a,2b and 2c of the vibrator 1 and the horizontal electrodes 4a, 4b, 4c and 4d. The horizontal electrodes 4b and 4d have the application of the alternating voltage of opposite phase relative to the horizontal electrodes 4a and 4c provided by a phase inverting circuit 117.

With respect to the output of the amplify/d.c. merge circuit 119 and the input of the C-V conversion circuit 103, i.e., the vibration of vibrator 1 in the horizontal direction, the output of the C-V conversion circuit 103 always lags by 90° by the presence of the +90° phase shift circuit 112. That is, the vibration of vibrator 1 in the horizontal direction lags by 90°, which phase is kept locked by the PLL circuit 113. Consequently, the vibrator 1 vibrates continuously at its inherent resonant frequency and in a resonant state in the horizontal direction (the actual displacement lags by 90° behind the drive phase of the vibrator).

In consequence, the vibration continues in the resonant state, which yields the maximum displacement, even if the resonant frequency inherent to the vibrator 1 varies due to a small variation of its dimensions caused by an external temperature variation. The PLL circuit 113 has its output used for the sync signal of a synchronous detection circuit 107. Accordingly, the circuit 107 detects only the component that is in-phase with the output of the PLL circuit 113 out of the capacitance variation of the vibrator 1 in the vertical direction, and the detection output is treated by the following LPF 108 to deliver an intended output. In this case, the output phase is locked by the PLL circuit 113 and thus is not disturbed by the operation of the synchronous detection circuit 107, whereby a stable output is obtained.

When the silicon gyroscope is subjected to an angular velocity along the longitudinal direction of the vibrator 1, the Coriolis force acts on the elastic arms 2a,2b and 2c of vibrator 1 which are vibrating in the horizontal direction.

A Coriolis force Fc resulting from an angular velocity w (vector) exerted on a mass m which is moving at a velocity V (vector) is expressed as Fc=2 m(V×w), where × indicates the vector product. For example, when the vibrator 1 is vibrating horizontally and is subjected to an angular velocity about its longitudinal axis, the Coriolis force acts on it in the vertical direction. Therefore, the vibrator 1 has a displacement in the vertical direction in synchronism with the horizontal vibration. The value of displacement is proportional to the exerted angular velocity.

The vertical displacement of the vibrator 1 is proportional to the variation of static capacitance created in unison with the vertical electrodes 5a,5b and 5c. Accordingly, by detecting the static capacitance variation of vertical direction which is in-phase with the horizontal vibration of the vibrator 1, the magnitude of angular velocity and its direction (turning direction) exerted on the silicon gyroscope can be known.

The foregoing behavior of the silicon gyroscope which implements the horizontal drive and vertical detection holds also in the case of an alternative arrangement for vertical drive and horizontal detection, with the associated circuits being interchanged.

Figure 7:
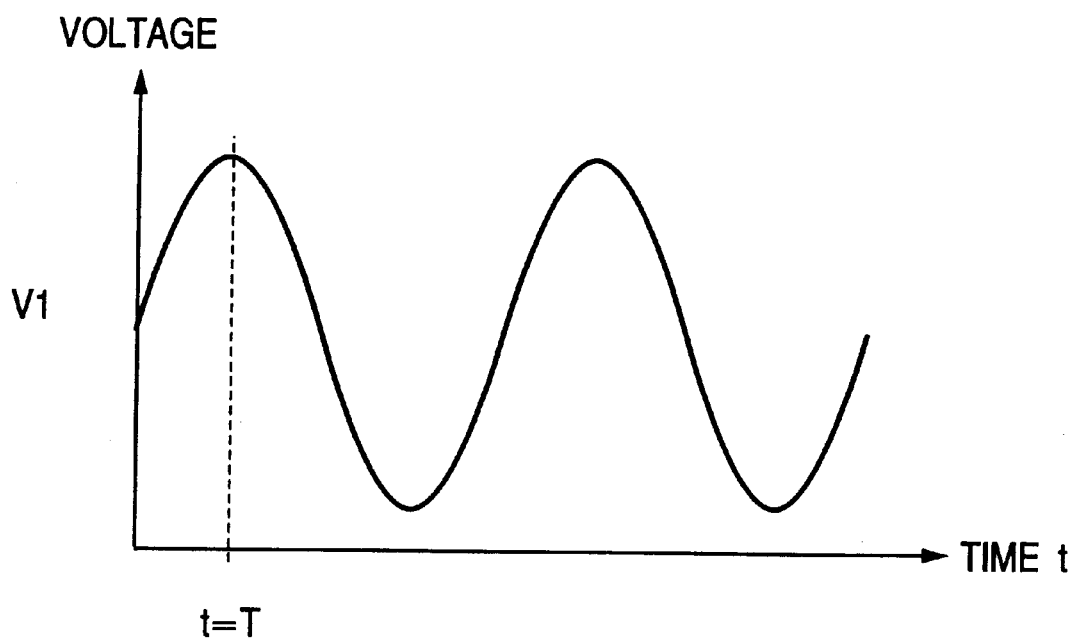
FIG. 7 is a graph showing the output characteristics of the amplify/d.c. voltage merge circuit 119 shown in FIG. 6.
Figure 8:
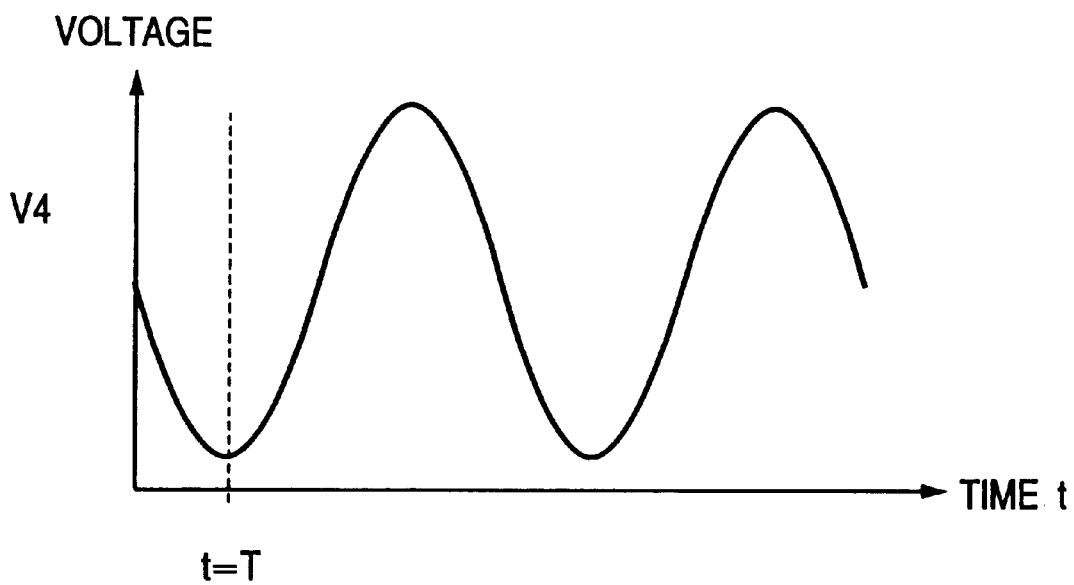
FIG. 8 is a graph showing the output characteristics of the amplify/d.c. voltage merge circuit 118 shown in FIG. 6.

Next, the inventive method of driving the vibrator 1 will be explained in connection with FIG. 7 and FIG. 8 showing the outputs of the amplify/d.c. merge circuits 118 and 119 shown in FIG. 6. These graphs have a horizontal axis for the time and a vertical axis for the output voltage, which gives the reference potential of 0 volt at the intersection with the time axis.

Since the circuit arrangement is designed such that the C-v conversion circuit 103 has its potential seen from the vibrator 1 being equivalent to the reference potential, the potential of vibrator seen from the reference potential is conceived to be zero volt.

In FIG. 7 and FIG. 8, the vibrator 1 has the reference potential, while the horizontal electrodes 4a,4b,4c and 4d have their potential varying in sinusoidal fashion, resulting in a potential difference emerging between the vibrator 1 and the horizontal electrodes 4a,4b,4c and 4d. Although the horizontal electrodes 4a,4b,4c and 4d actually have the superimposed carrier wave of 70 kHz provided by the oscillation circuit 120 and a phase inverting circuit 121, this frequency component is insignificant for the explanation of circuit operation and is not shown in FIGS. 7 and 8.

The horizontal electrodes 4a and 4c have their potential consisting of the alternating voltage and a superimposed positive d.c. voltage as shown in FIG. 7, while the horizontal electrodes 4b and 4d have their potential consisting of the alternating voltage of an inverted phase and the same superimposed positive d.c. voltage as shown in FIG. 8.

The vibration of the elastic arms 2a,2b and 2c of the vibrator 1 caused by the produced electric field will be explained in connection with FIG. 9 and FIG. 10. These figures schematize the relation among the elastic arms 2a,2b and 2c of the vibrator 1, the horizontal electrodes 4 which are shown by double-frame blocks, and the vertical electrodes (not shown).

Figure 9:
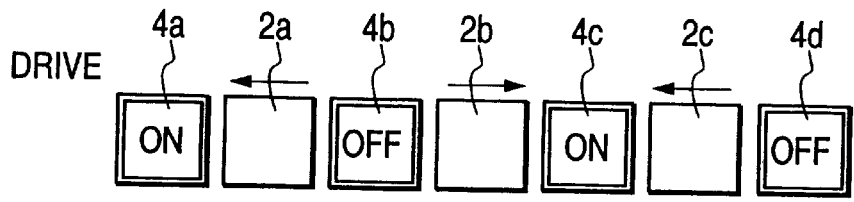
FIG. 9 is a conceptual diagram showing the displacements of elastic arms at time point t=T in FIG. 7 caused by driving.

In FIG. 9, labels ON and OFF indicate the voltage application to the horizontal electrodes at time point t=T in FIGS. 7 and 8. Specifically, according to the voltage application to the horizontal electrodes 4a and 4c shown in FIG. 7, these electrodes have the maximum potential difference from the vibrator 1 at time point t=T, i.e., ON state.

Similarly, the horizontal electrodes 4b and 4d have the minimum potential difference from the vibrator 1 at this time point shown in FIG. 8, i.e., OFF state.

In FIG. 9, the horizontal electrodes 4a and 4c are ON and the horizontal electrodes 4b and 4d are OFF at time point t=T, and the resulting electric field causes the outer elastic arms 2a and 2c of the vibrator 1 to move to the left and the middle elastic arm 2b to move to the right. At this time, if the gyroscope is subjected to a clockwise angular velocity on the drawing, the Coriolis force acts on the arms 2a, 2b and 2c as indicated by the arrows in FIG. 10, causing the elastic arms to have displacements in the directions indicated by the arrows. Accordingly, the elastic arms 2a,2b and 2c have vertical displacements, resulting in a narrowed gap between the arms 2a and 2c and the vertical electrodes 5a and 5c (not shown) and a widened gap between the arm 2b and the vertical electrode 5b (not shown). Consequently, the static capacitance varies, and the angular velocity can be evaluated by measuring the variation of static capacitance.

In case the gyroscope is subjected to a counterclockwise angular velocity, the directions of arrows mentioned in the foregoing explanation are reversed. The output of synchronous detection circuit which is in-phase with the vibrator displacement reverses, and the direction of angular velocity can be discriminated.

Figure 11:
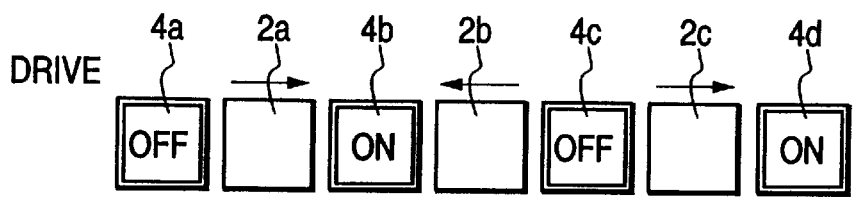
FIG. 11 is a conceptual diagram showing the displacements of elastic arms at time point t=T in FIG. 7 caused by driving with the application of opposite-phase voltages.
Figure 12:
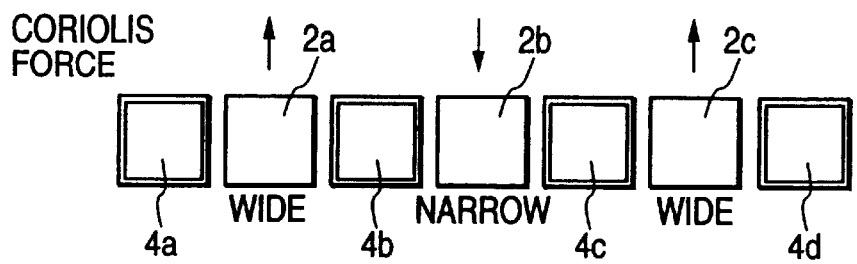
FIG. 12 is a conceptual diagram showing the displacements of elastic arms at time point t=T in FIG. 7 caused by the Coriolis force with the application of opposite-phase voltages.

FIG. 11 and FIG. 12 schematize the operation of the gyroscope at another time point which is shifted by π from time point t=T, i.e., the vibrator 1 is driven by the alternating voltage in opposite phase.

The C-V conversion circuit 103 is designed such that the amplitude of the carrier wave which is derived from the oscillation circuit 101 is proportional to the value of static capacitance. For example, when the gap between the outer elastic arms 2a and 2c of the vibrator 1 and the vertical electrodes (not shown) narrows as shown in FIG. 10, a resulting increased static capacitance increases the amplitude of the carrier wave component which is in-phase with the oscillation circuit 101. Whereas, the static capacitance of the middle elastic arm 2b decreases. Since the vertical electrode which confronts the middle elastic arm 2b is provided by the phase inverting circuit 102 with the carrier wave of opposite phase relative to the oscillation circuit 101, the carrier wave component of opposite phase decreases.

Figure 10:
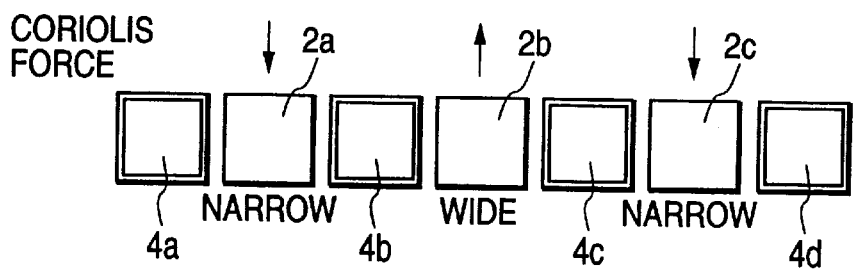
FIG. 10 is a conceptual diagram showing the displacements of elastic arms at time point t=T in FIG. 7 caused by the Coriolis force.

As a result, at the output of the C-V conversion circuit 103, the carrier wave component which is in-phase with the oscillation circuit 101 increases in response to the Coriolis force acting at the timing shown in FIGS. 9 and 10. The output of the synchronous detection circuit 107 is fed through the LPF 108, and the output of positive polarity, for example, is delivered.

At a counterclockwise angular velocity, the direction of Coriolis force shown in FIGS. 10 and 12 reverses. The LPF 108 delivers the output of negative polarity, and the direction of angular velocity can be discriminated.

Figure 13:
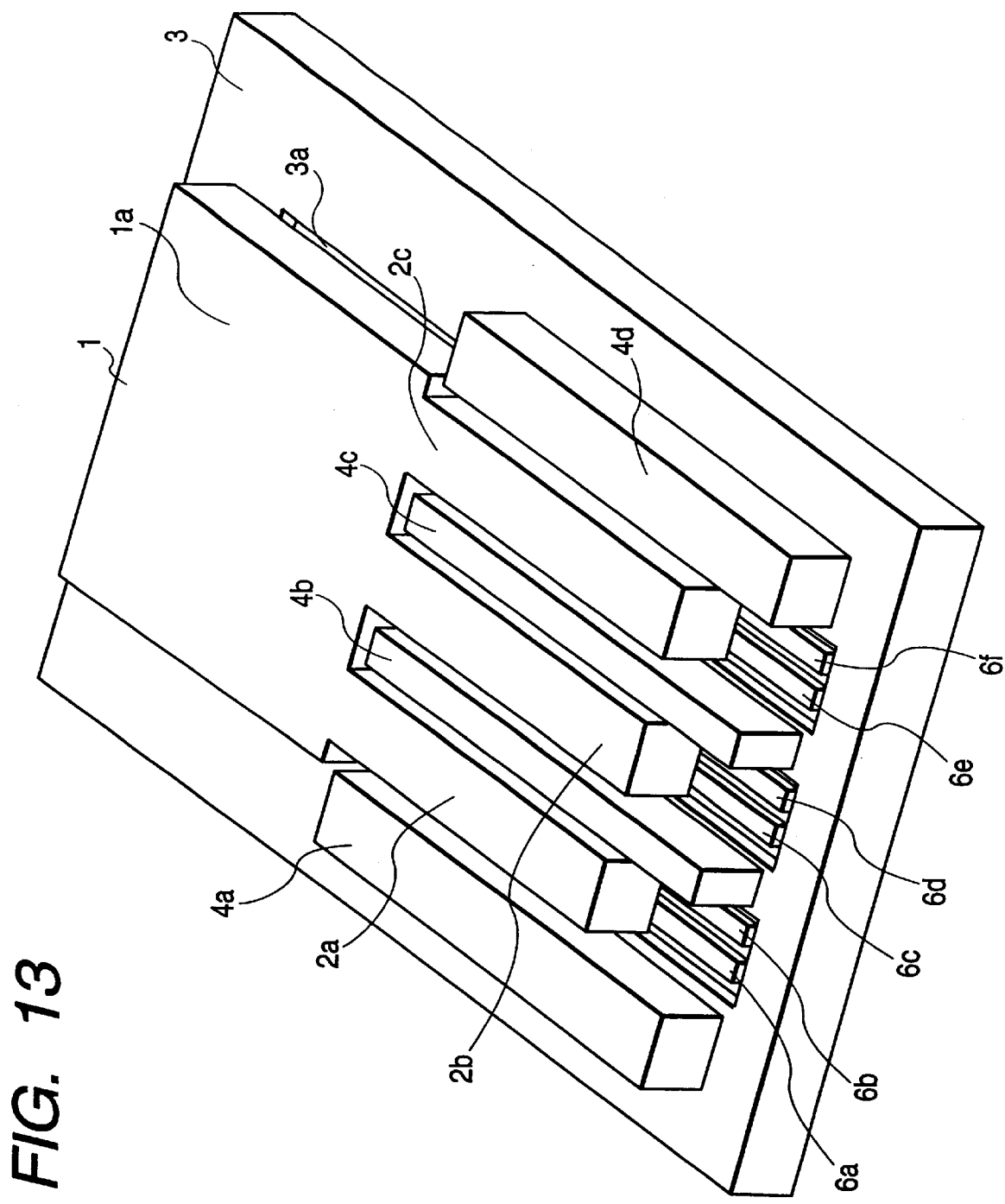
FIG. 13 is a perspective view of a silicon gyroscope based on a second embodiment of this invention.
Figure 14:
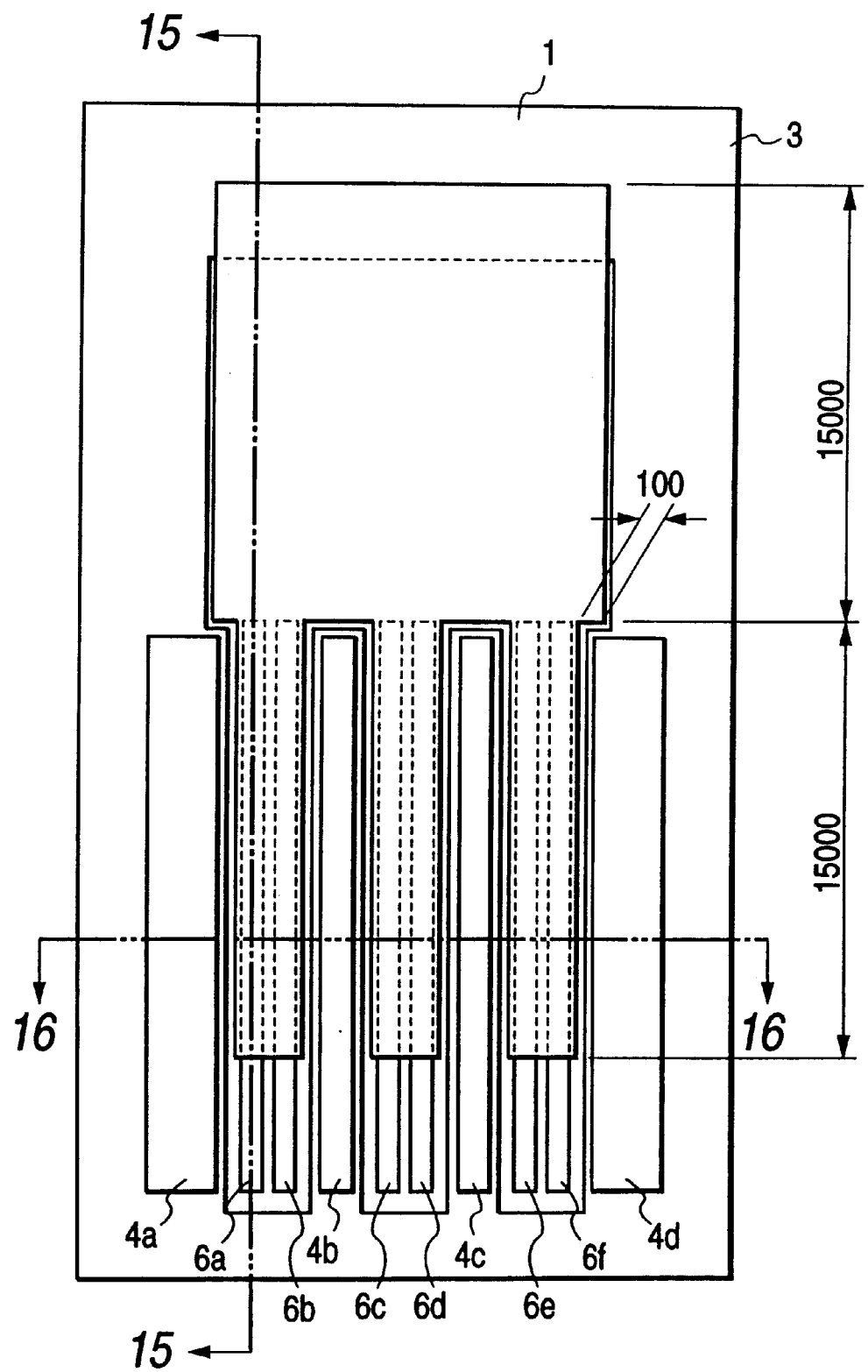
FIG. 14 is a plan view of the silicon gyroscope shown in FIG. 13.
Figure 15:
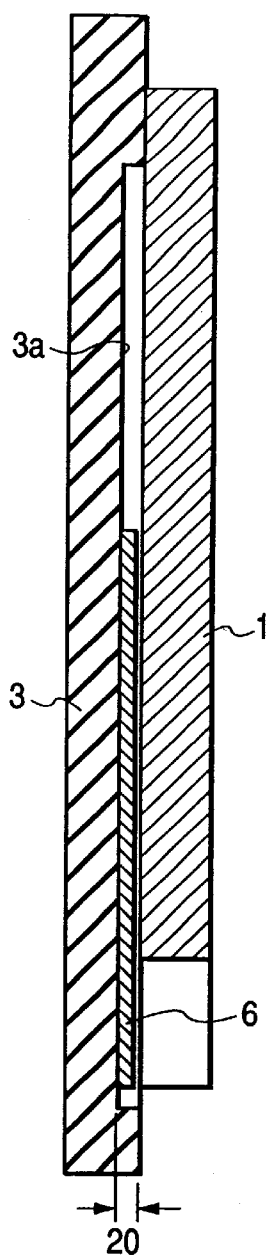
FIG. 15 is a cross-sectional view taken along the line 15—15 of FIG. 14.
Figure 16:
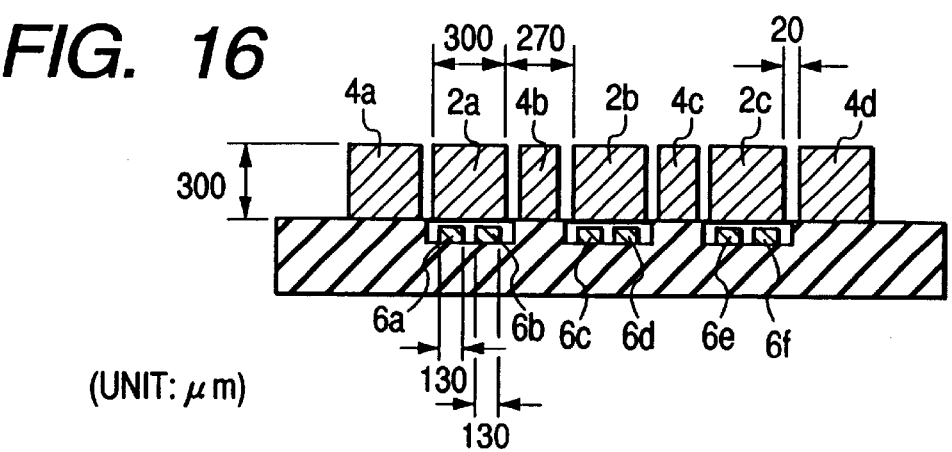
FIG. 16 is a cross-sectional view taken along the line 16—16 of FIG. 14.

FIG. 13 shows a silicon gyroscope based on the second embodiment this invention, and FIG. 14 shows by a plan view the dimensions of the vibrator 1 of this embodiment. The vibrator 1 fabricated to have these dimensions operates at a resonant frequency of about 2 kHz. FIG. 15 and FIG. 16 are cross-sectional views taken along the line 15—15 and line 16—16, respectively, of FIG. 14.

The silicon gyroscope of the second embodiment differs from that of the preceding first embodiment only in the formation of vertical electrodes 6 in pairs (6a,6b; 6c,6d; 6e,6f) in correspondence to the elastic arms 2a,2b and 2c of the vibrator 1.

Figure 17:
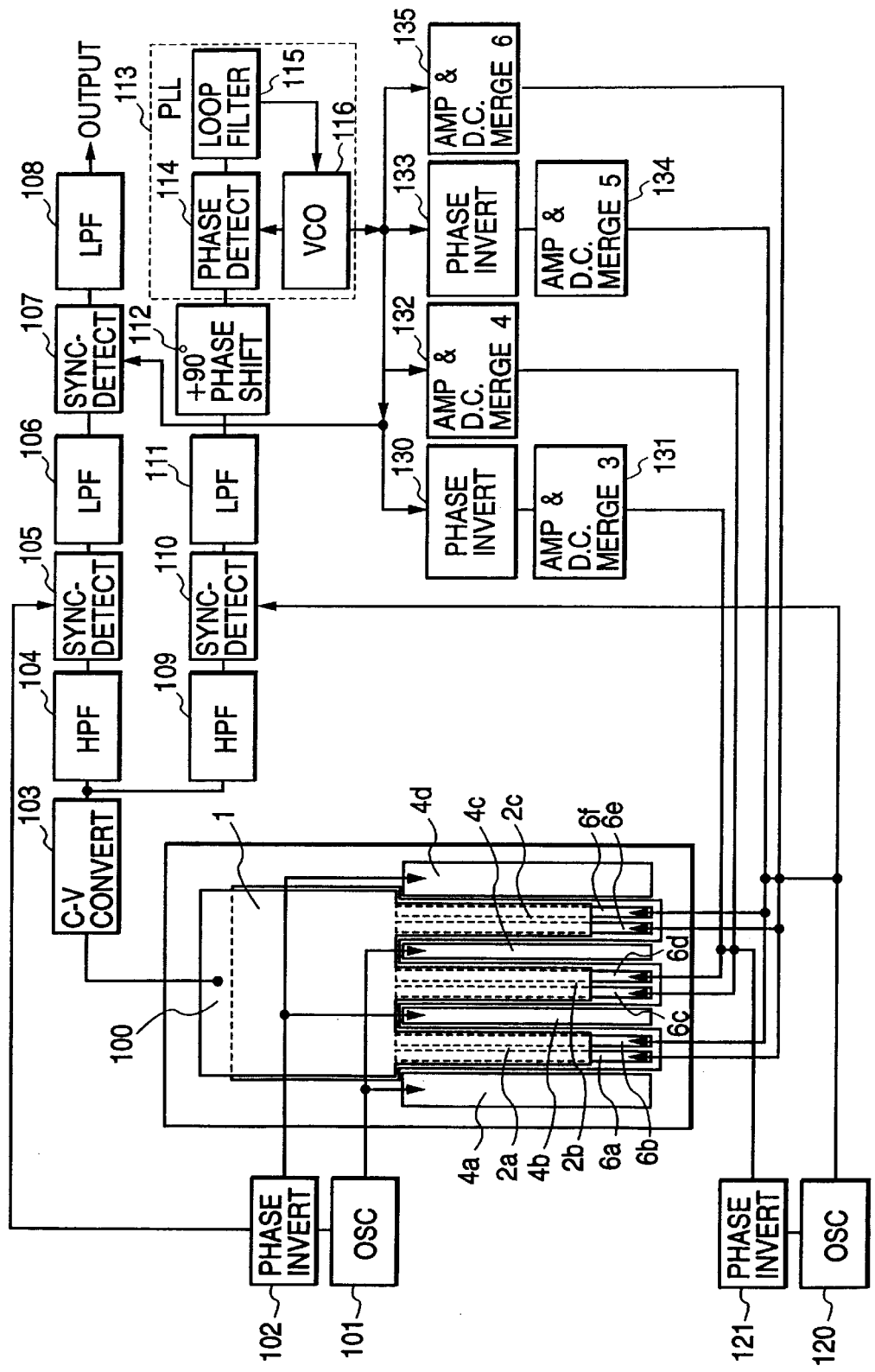
FIG. 17 is a block diagram of the drive/detect circuit of the silicon gyroscope of the second embodiment.
Figure 18:
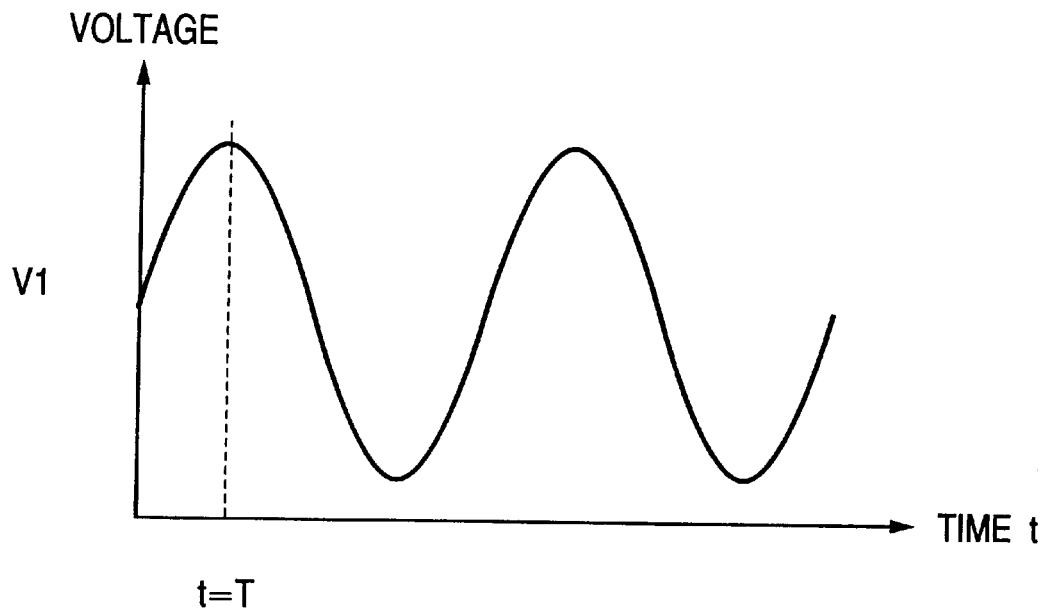
FIG. 18 is a graph showing the output characteristics of the amplify/d.c. voltage merge circuit 135 shown in FIG. 17.
Figure 19:
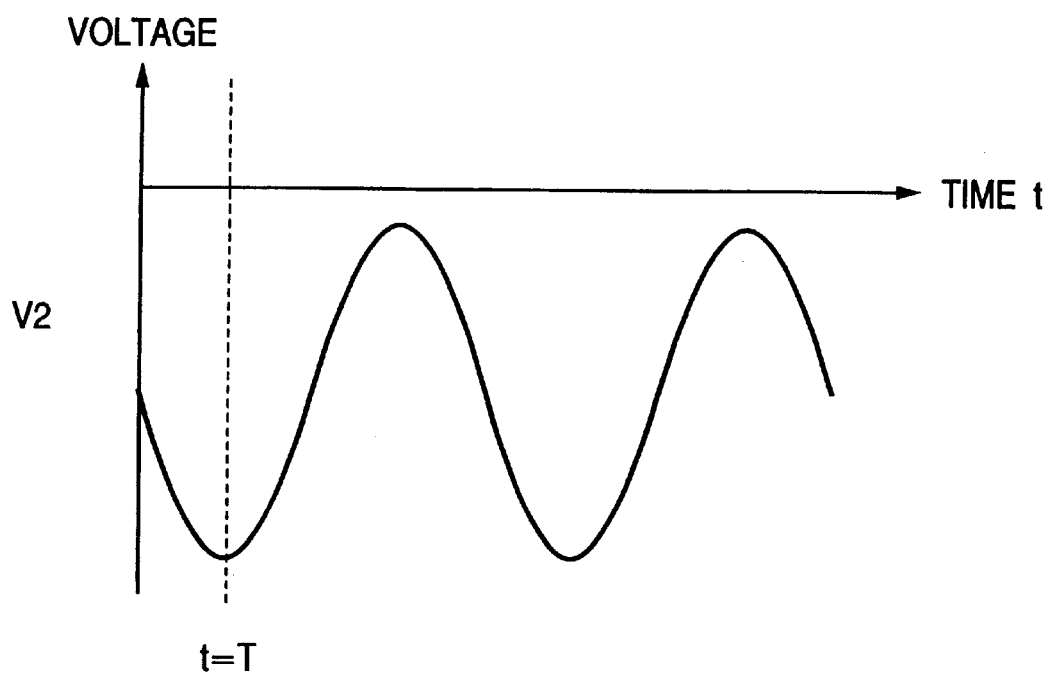
FIG. 19 is a graph showing the output characteristics of the amplify/d.c. voltage merge circuit 134 shown in FIG. 17.

FIG. 17 shows by a block diagram the circuit arrangement for driving and detection of the silicon gyroscope of the second embodiment shown in FIG. 13. The oscillation circuit 101 generates an alternating voltage having a frequency of 50 kHz and amplitude of 5 volts, and the voltage is applied to the horizontal electrodes 4a and 4c. The phase inverting circuit 102 produces a carrier wave of opposite phase relative to the voltage provided by the oscillation circuit 101, and it is applied to the horizontal electrodes 4b and 4d.

The horizontal electrodes 4a, 4b, 4c and 4d are spaced out with a gap of 20 µm from the elastic arms 2a,2b and 2c of the vibrator 1, so that a static capacitance emerges across the gaps, which is converted into a voltage value by the C-V conversion circuit 103.

The C-V conversion circuit 103 has its output fed through the HPF 104 having a cutoff frequency of 10 kHz, and the resulting voltage signal is fed to the synchronous detection circuit 105, which implements the synchronous detection for the signal based on the frequency and phase of the oscillation circuit 101. The detection output is fed through the LPF 106, with its output representing the variation of static capacitance between the horizontal electrodes 4a, 4b, 4c and 4d and the three elastic arms 2a,2b and 2c of the vibrator 1 in their horizontal direction.

The vibrator 1 which is made of low-resistivity silicon is conceived to be electrically conductive for the alternating voltage with respect to the impedance component of the static capacitance between the elastic arms 2a,2b and 2c of the vibrator 1and the horizontal electrodes 4a to 4d. Accordingly, the capacitance variations of the three elastic arms 2a, 2b and 2c are coupled at the signal lead-out section 100 and fed by being summed to the C-V conversion circuit 103.

Among the vertical electrodes 6a, 6b, 6c, 6d, 6e and 6f, the electrodes 6a and 6e that are in jumper connection and the electrodes 6b and 6f that are in jumper connection are connected to the oscillation circuit 120 by way of voltage dividing resistors (not shown). The vertical electrodes 6c and 6d are connected to the phase inverting circuit 121 by way of voltage dividing resistors (not shown).

The oscillation circuit 120 generates a voltage having a frequency of 70 kHz and amplitude of 5 volts. Due to the spacing with a 20-µm gap between the vertical electrodes 6a,6b,6c,6d,6e and 6f and the three elastic arms 2a,2b and 2c of vibrator, there emerge the static capacitance across the gaps, which is converted into a voltage value by the C-V conversion circuit 103.

The C-V conversion circuit 103 has its output fed through the HPF 109 having a cutoff frequency of 10 kHz, and subsequently rendered the synchronous detection by the synchronous detection circuit 110 based on the frequency and phase of the oscillator 120. The detection output is fed through the LPF 111, with its output representing the variation of static capacitance between the vertical electrodes 6a,6b,6c,6d,6e and 6f and the three elastic arms 2a,2b and 2c of the vibrator 1 in their vertical direction.

The paired vertical electrodes 6a and 6e and 6d and 6f are connected to the amplify/d.c. merge circuits 118 and 119, respectively, by way of d.c. component cutting capacitors and voltage dividing resistors (not shown). The vertical electrodes 6c and 6d are connected to the amplify/d.c. merge circuits 132 and 131, respectively.

The LPF 111 has its output fed through the +90° phase shift circuit 112 and the PLL circuit 113, which is made up of the voltage-controlled oscillator (VCO) 116, the phase detection circuit 114 which compares the vibration phase of the vibrator with the oscillation phase of the VCO 116, and the loop filter 115, so that there is always a phase difference of +90° between the input and output of the PLL circuit 113, i.e., between the output of the +90° phase shift circuit 112 and the output of the VCO 116. The PLL circuit 113 has its output amplified by the amplify/d.c. merge circuits 131,132, 134 and 135, by which a d.c. voltage is superimposed, and consequently there emerges an electrostatic attraction force between the elastic arms 2a,2b and 2c of the vibrator 1 and the vertical electrodes 6a,6b,6c,6d,6e and 6f.

With respect to the outputs of the amplify/d.c. merge circuits 132 and 135 and the input of the C-V conversion circuit 103, i.e., the vibration of vibrator 1 in the vertical direction, the output of the C-V conversion circuit 103 always lags by 90° by the presence of the +90° phase shift circuit 112. That is, the vibration of vibrator 1 in the vertical direction lags by 90°, which phase is kept locked by the PLL circuit 113. Consequently, the vibrator 1 vibrates continuously at its inherent resonant frequency and in a resonant state in the vertical direction (the actual displacement lags by 90° behind the drive phase of the vibrator).

Next, the inventive method of voltage application to the vertical electrodes will be explained in connection with FIG. 18 through FIG. 21 showing the outputs of the amplify/d.c merge circuits 134,135,131 and 132, respectively, shown in FIG. 17. These graphs have a horizontal axis for the time and a vertical axis for the output voltage, which gives the reference potential of 0 volt at the intersection with the time axis.

Since the circuit arrangement is designed such that the C-V conversion circuit 103 has its potential seen from the vibrator 1 being equivalent to the reference potential, the potential of vibrator seen from the reference potential is conceived to be zero volt.

In FIGS. 18–21, the vibrator 1 has the reference potential and it is subjected to the electric fields attributable to the potentials of the vertical electrodes 6a,6b,6c,6d,6e and 6f varying in sinusoidal fashion.

Figure 20:
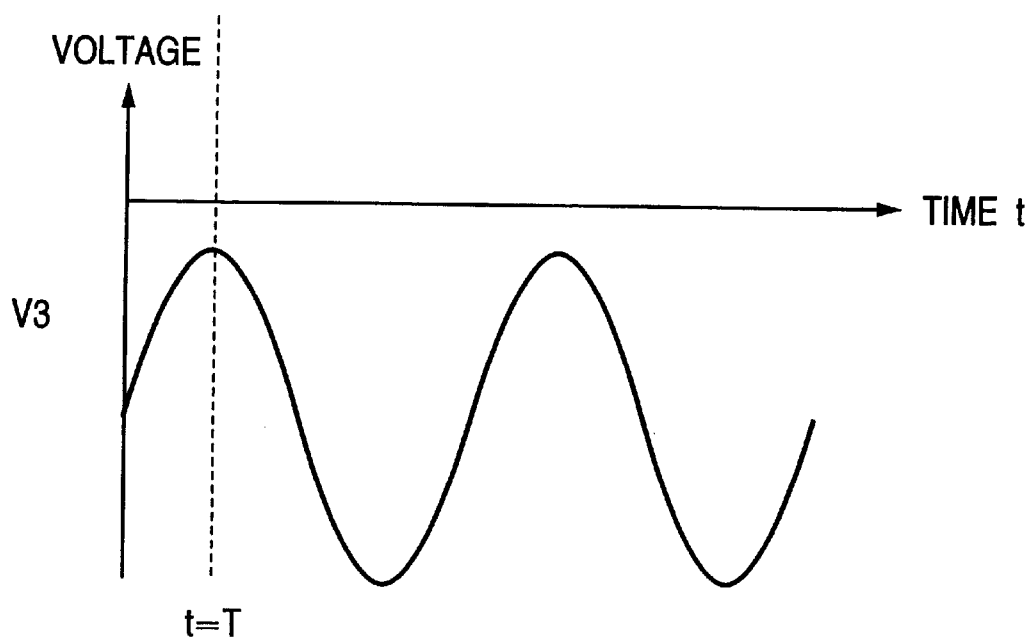
FIG. 20 is a graph showing the output characteristics of the amplify/d.c. voltage merge circuit 132 shown in FIG. 17.
Figure 21:
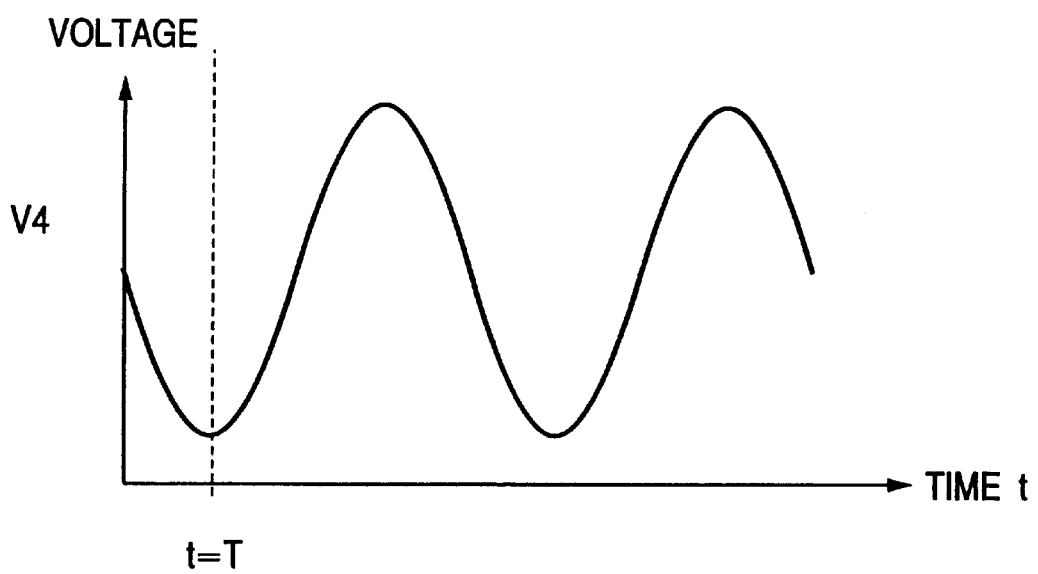
FIG. 21 is a graph showing the output characteristics of the amplify/d.c. voltage merge circuit 131 shown in FIG. 17.

The vertical electrode pairs 6a and 6b and 6e and 6f which confront the outer elastic arms 2a and 2c of the vibrator 1 have opposite phases and also have opposite polarities of superimposed d.c. voltage. Similarly, the vertical electrodes 6c and 6d which confront the middle arm 2b have opposite phases and d.c. polarities as shown in FIGS. 20 and 21.

By the application of these voltages, the elastic arms 2a,2b and 2c of the vibrator 1 have the exertion of electrostatic force of the confronting electrodes at time point t=T in FIG. 18 through FIG. 21 as follows.

| arms | 2a | | 2b | | 2c | |
| --- | --- | --- | --- | --- | --- | --- |
| electrodes | 6a | 6b | 6c | 6d | 6e | 6f |
| a.c. component | positive maximum | negative maximum | negative minimum | positive minimum | positive maximum | negative maximum |
| d.c. component electrostatic force | positive maximum | negative | negative minimum | positive | positive maximum | negative |

Accordingly, the outer elastic arms 2a and 2c have the maximum electrostatic force of the electrodes, while the middle arm 2b has the minimum force of the electrode.

Figure 22:
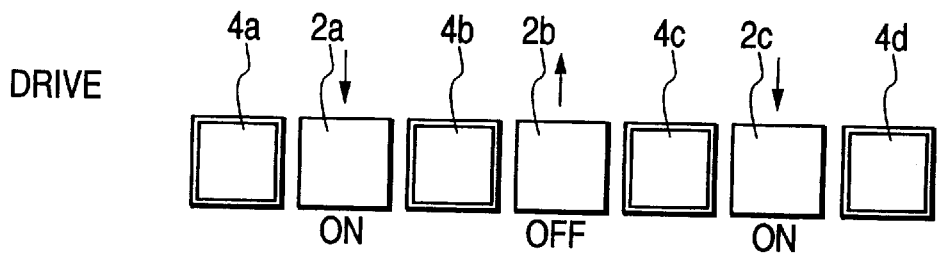
FIG. 22 is a conceptual diagram showing the displacements of elastic arms at time point t=T in FIGS. 18 to 21 caused by driving.
Figure 23:
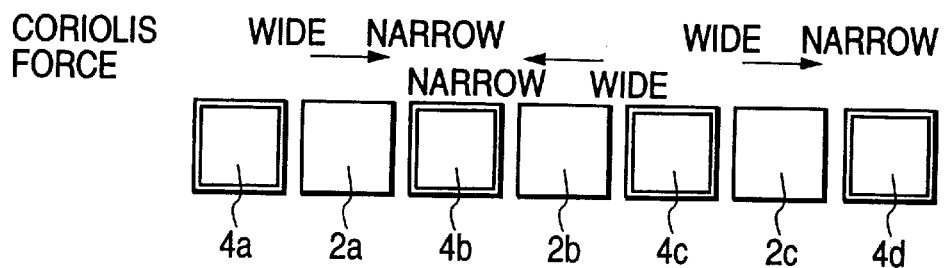
FIG. 23 is a conceptual diagram showing the displacements of elastic arms at time point t=T in FIGS. 18 to 21 caused by the Coriolis force.

FIG. 22 and FIG. 23 schematize the movement of the elastic arms 2a,2b and 2c and the Coriolis force acting on them in the presence of the electrostatic force and a clockwise angular velocity. The figures show that the electrostatic force of the elastic arms 2a and 2c is maximum in the vertical direction, while the electrostatic force of the elastic arm 2b is minimum.

The Coriolis force acts on the elastic arms as shown in FIG. 23, causing the static capacitance to vary, and the angular velocity can be evaluated by measuring the variation of static capacitance.

In case the gyroscope is subjected to a counterclockwise angular velocity, the directions of arrows mentioned in the foregoing explanation are reversed. The output of synchronous detection circuit which is in-phase with the vibrator displacement reverses, and the direction of angular velocity can be discriminated.

Figure 24:
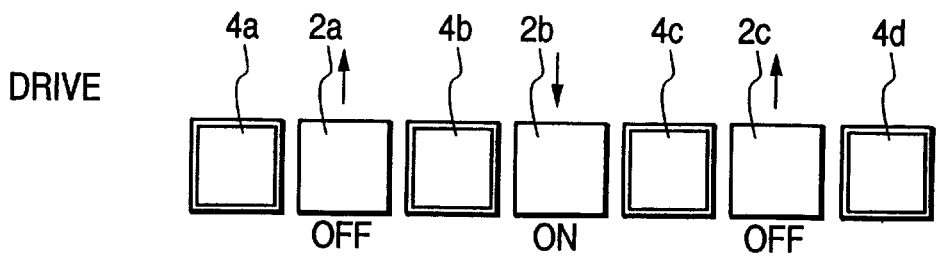
FIG. 24 is a conceptual diagram showing the displacements of elastic arms at time point t=T in FIGS. 18 to 21 caused by driving with the application of opposite-phase voltages.
Figure 25:
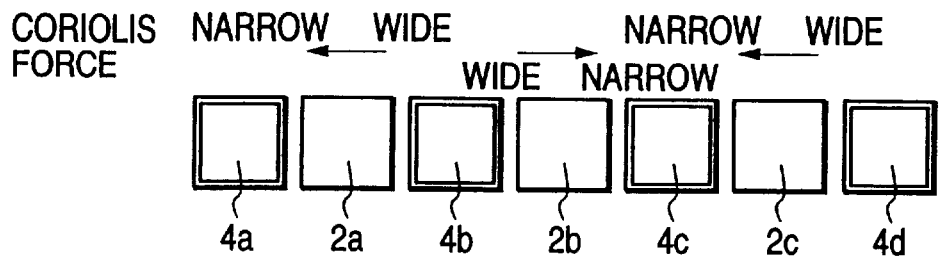
FIG. 25 is a conceptual diagram showing the displacements of elastic arms at time point t=T in FIGS. 18 to 21 caused by the Coriolis force with the application of opposite-phase voltages.

FIG. 24 and FIG. 25 schematize the operation of the gyroscope at another time point which is shifted by π from time point t=T, i.e., the vibrator 1 is driven by the alternating voltage in opposite phase.

The C-V conversion circuit 103 is designed such that the amplitude of the carrier wave which is derived from the oscillation circuit 101 is proportional to the value of static capacitance. For example, when the elastic arms 2a and 2c of the vibrator 1 have displacements due to the Coriolis force shown in FIG. 23, the amplitude of the carrier wave component which is in-phase with the oscillation circuit (oscillator) 101 decreases, while the carrier wave component which is in-phase with the phase inverting circuit 102, i.e., opposite in phase from the oscillation circuit 101, increases.

As a result, at the output of the C-V conversion circuit 103, the carrier wave component which is opposite in phase from the oscillation circuit 101 increases in the presence of a clockwise angular velocity and the Coriolis force shown in FIG. 23. The output of the synchronous detection circuit 107 is fed through the LPF 108, and the output of negative polarity, for example, is delivered.

At a counterclockwise angular velocity, the direction of Coriolis force shown in FIGS. 23 and 25 reverses. The LPF 108 delivers the output of positive polarity, and the direction of angular velocity can be discriminated.

The C-V conversion circuit 103, which converts the input of high-impedance static capacitance into a voltage value, is susceptible to electromagnetic noises or the like. The variation of static capacitance caused by the Coriolis force is as extremely small as several tens aF, and it can possibly be hidden in external electromagnetic noises instead of being detected.

The preceding first embodiment is also designed to drive the vibrator 1 to vibrate by exerting the electrostatic force and detect the displacement of elastic arms 2a,2b and 2c of the vibrator 1 caused by the Coriolis force in terms of the variation of static capacitance. Because of the same frequency of the drive operation and of the variation of static capacitance caused by the Coriolis force, induction noises created at driving can possibly leak into the C-V conversion circuit 103.

Whereas, the second embodiment is designed to divide the driving electrodes into multiple electrodes (a pair of vertical electrodes for each elastic arm 2 in this embodiment), with a.c. components of opposite phases being applied thereto, so that the influence of drive voltage components on the elastic arms 2a,2b and 2c is reduced. For example, the preceding table of electrostatic force reveals that for the elastic arm 2a in FIG. 13, the a.c. components of the vertical electrodes 6a and 6b cancel each other as a result of summation. This fact also holds in the cases of remaining vertical electrodes 6c,6d,6e and 6f corresponding to the middle and rightmost elastic arms 2b and 2c.

Based on the dividing of driving electrodes and application of a.c. components of opposite phases to the divided electrodes, the electrostatic force comparable to the case of the undivided electrode can be obtained virtually without a loss of electrostatic force per unit area attributable to division, whereby it becomes possible to preclude the induction noise from being fed to the C-V conversion circuit 103.

That is, based on the dividing of the driving electrodes and application of a.c. components of opposite phases and d.c. components of opposite polarities to the divided electrodes so that the influences of electrodes cancel each other, the induction noise arising on the part of the detecting electrodes is minimized. Based on such rearrangement of electrodes for the same sensing device, it can achieve an enhanced sensitivity of detection and a high s/n ratio. Based on the dividing of the driving electrodes, it becomes possible to produce an electrostatic force comparable to the case of the undivided electrode at the same supply voltage virtually without a loss of electrostatic force to be exerted on the vibrator 1. It achieves the inherent function of driving the vibrator 1 identically to the case of the undivided electrode. Moreover, by finely adjusting the amplitude of the a. c. component which causes the induction noise, the second embodiment effectuates the cancellation of influence more than the preceding first embodiment.

The present invention is not confined to the foregoing embodiments, but various modifications are possible when necessary. For example, a variant design is such that the elastic arms of vibrator are driven in the vertical direction, and their displacements caused by the Coriolis force which acts on the electrodes in the horizontal direction are detected.

Next, the third and fourth embodiments of this invention will be explained with reference to FIG. 26 through FIG. 34.

Figure 26:
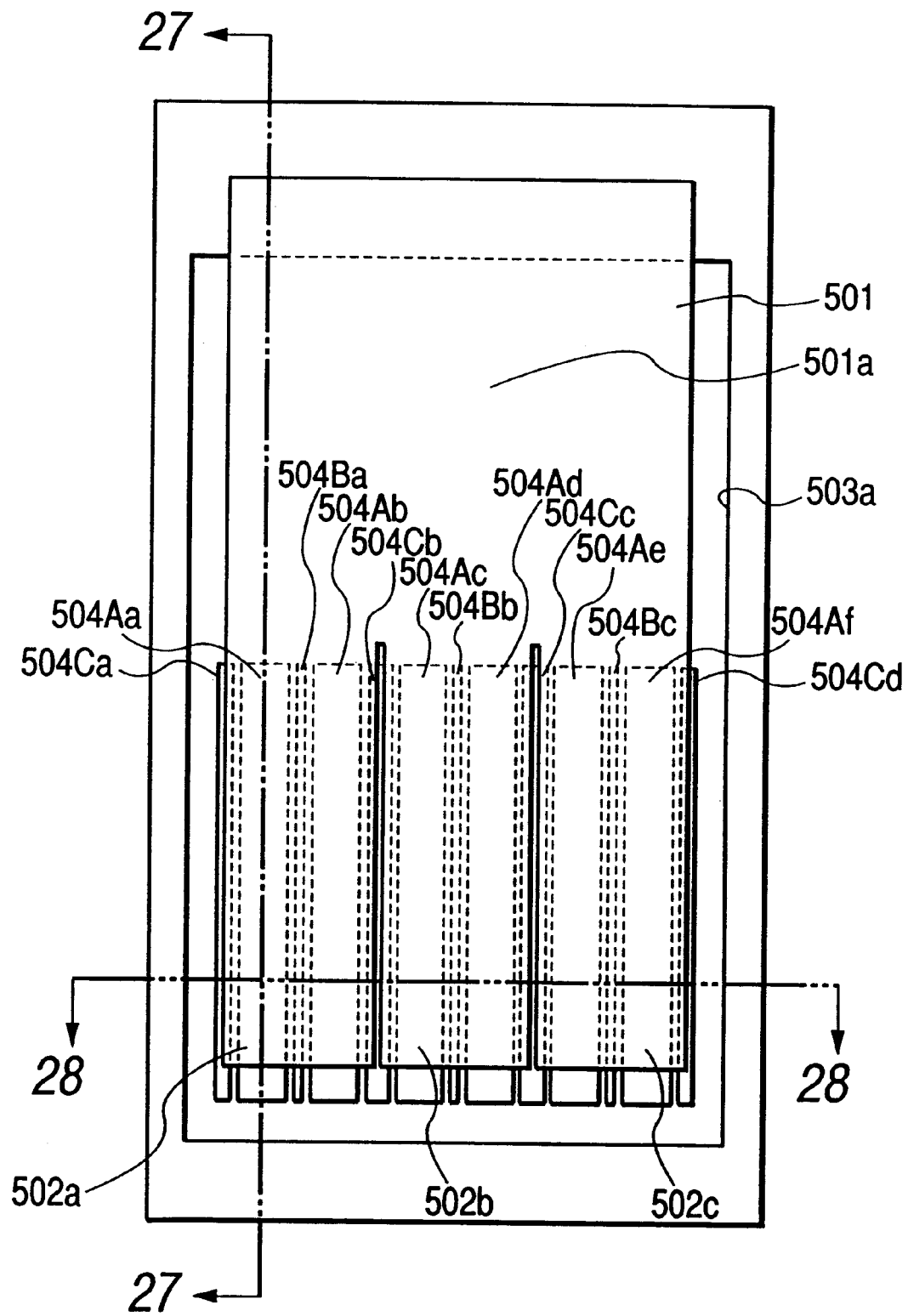
FIG. 26 is a plan view of a silicon gyroscope based on a third embodiment of this invention.
Figure 27:
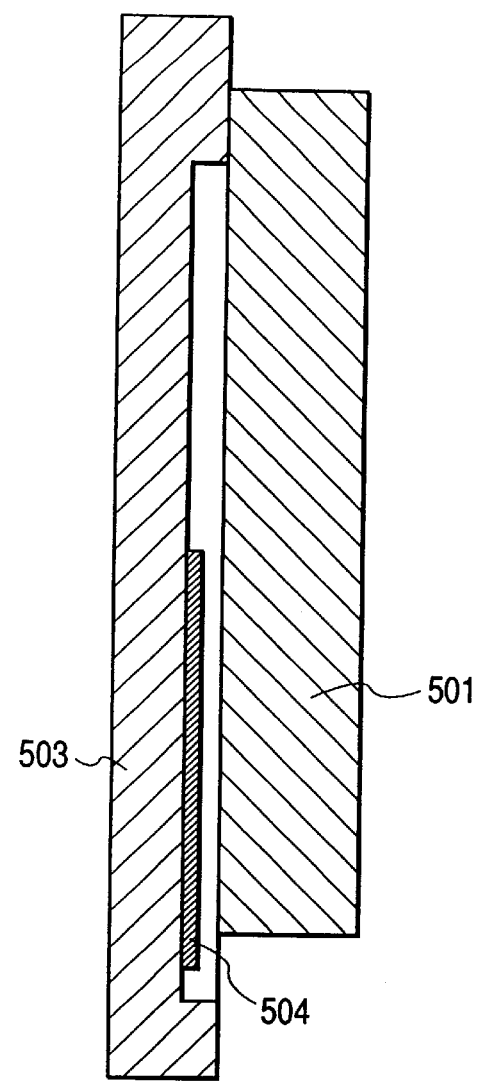
FIG. 27 is a cross-sectional view taken along the line 27—27 of FIG. 26.
Figure 28:
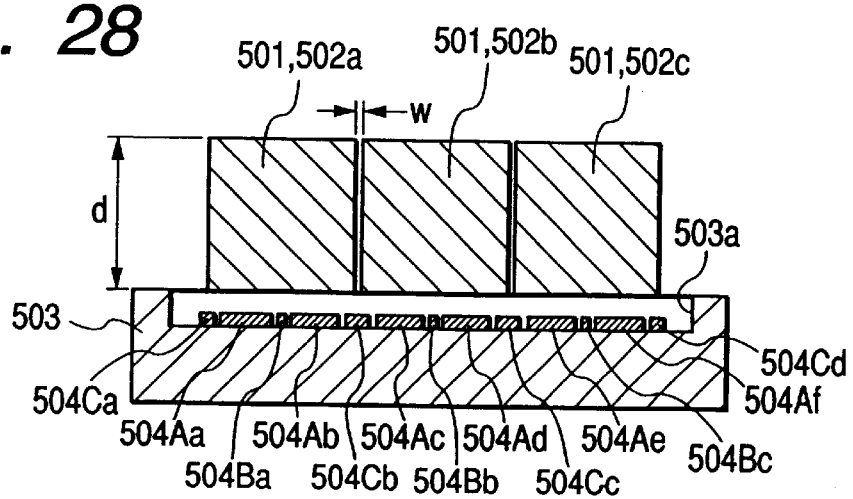
FIG. 28 is a cross-sectional view taken along the line 28—28 of FIG. 26.

FIG. 26 is a plan view of the silicon gyroscope of the third embodiment, and FIG. 27 and FIG. 28 are cross-sectional views taken along the line 27—27 and line 28—28, respectively, of FIG. 26.

The main body of silicon gyroscope of the third embodiment shown in FIG. 26 through FIG. 28 is made up of a vibrator 501, a base plate 503, and vertical electrodes 504. The vibrator 501 which is made of silicon consists of a root section 501a and three elastic arms 502a,502b and 502c which are parallel to each other and separated by two notches running from the root section 501a. The vibrator 501 is joined at its end of root section 501a to the base plate 503 of glass by means of anode plate bonding technique or the like.

Figure 34:
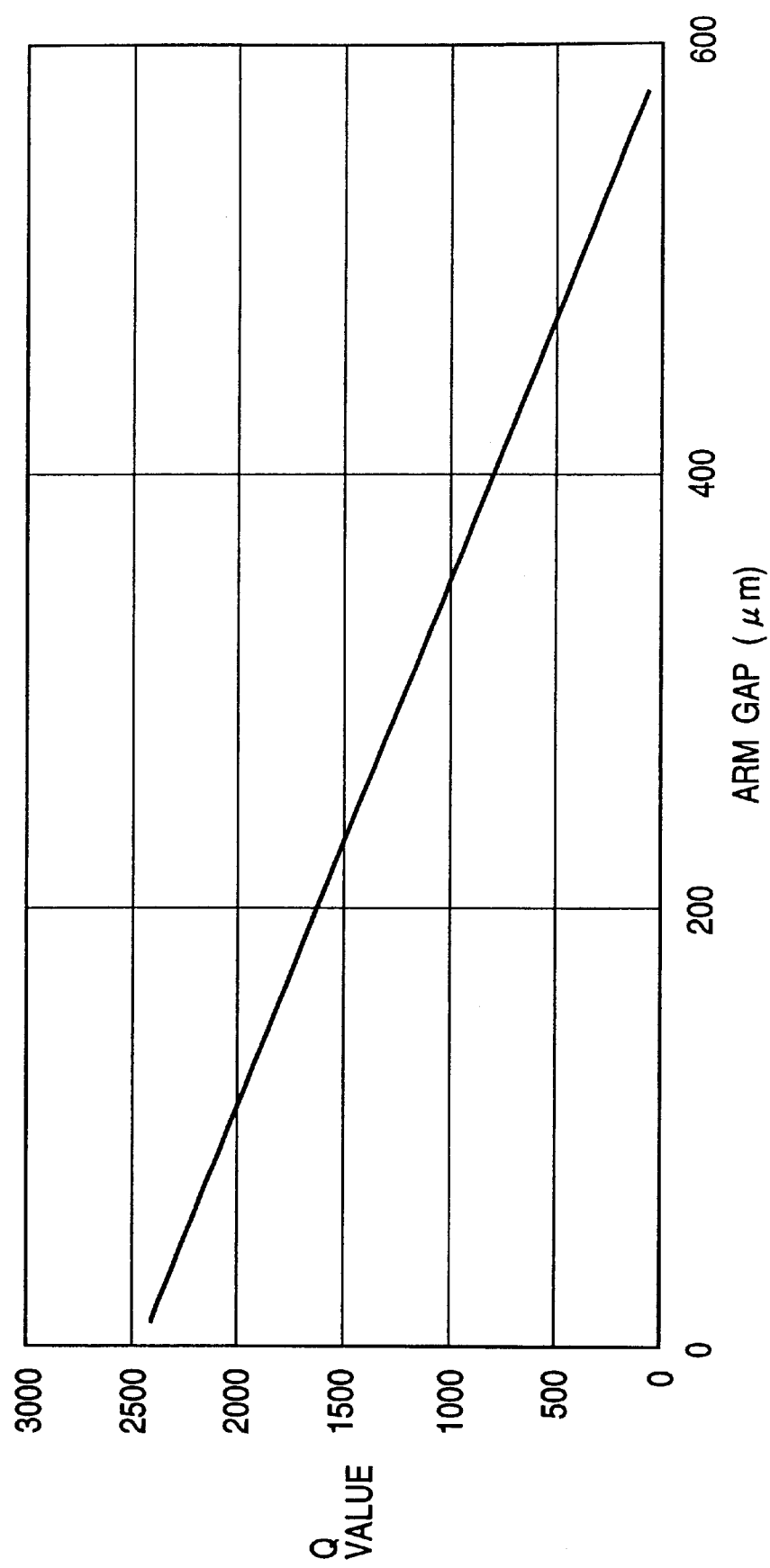
FIG. 34 is a graph showing the relation between the width of gap of elastic arms and the Q value of vibrator.
Figure 35:
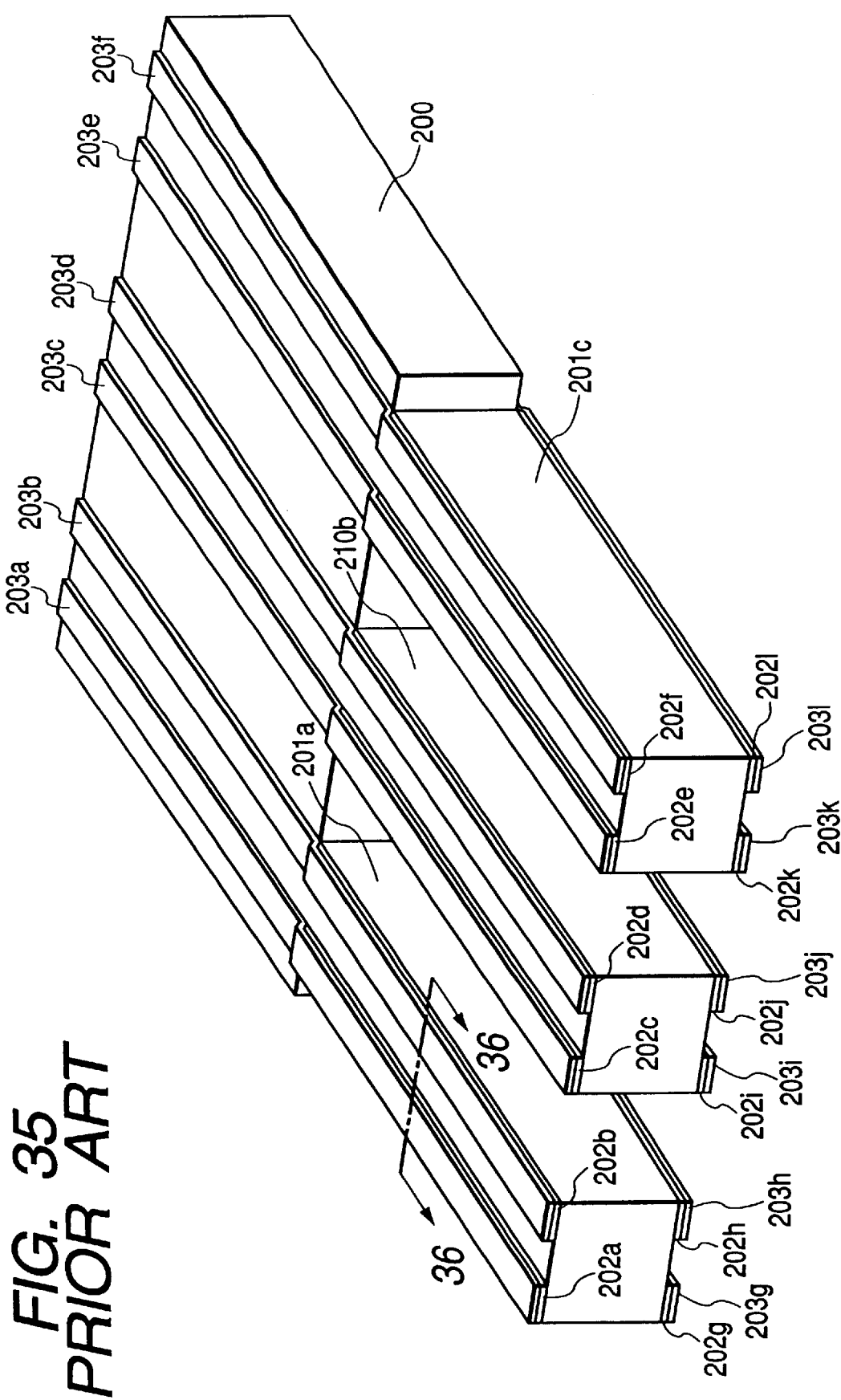
FIG. 35 is a perspective view of a conventional vibratory gyroscope made from constant elasticity metal.
Figure 36:
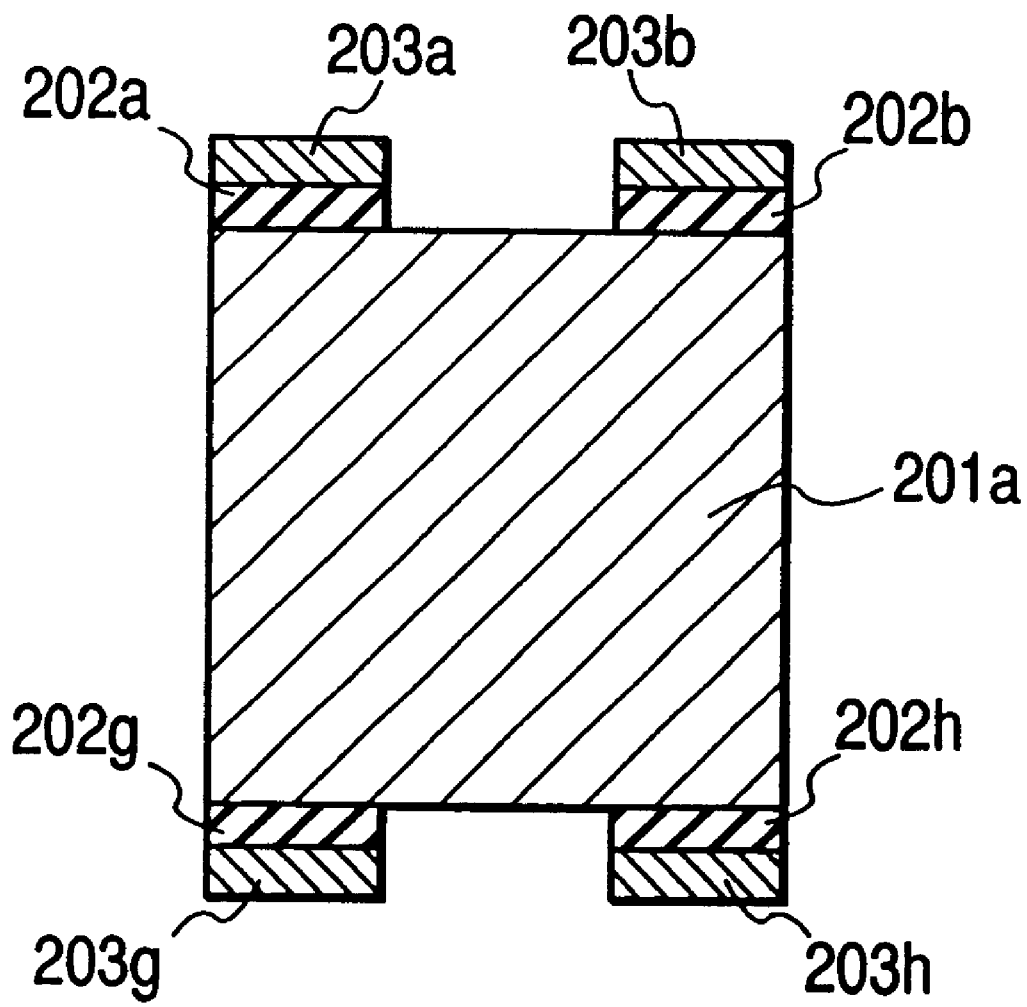
FIG. 36 is a cross-sectional view taken along the line 36—36 of FIG. 35.

The elastic arms 502a,502b and 502c are dimensioned to have a thickness d and a width W of notches between elastic arms related in terms of the value of W/d to be in the range from 1 to 0.02. If the W/d value is set 1 or smaller, the Q value becomes 1000 or greater as shown in FIG. 34, and making the W/d value smaller than 0.02 is technically difficult. Specifically, in the case of using a silicon wafer with a thickness d of 300 μm, the notch width w is preferably set within the range of 30 to 150 μm.

The vertical electrodes 504 which are made of chrome in this embodiment include driving electrodes 504A, drive-synchronous (-sync) electrodes 504B and Coriolis force detecting electrodes 504C, and these electrodes are laid in a groove 503a, which is formed on the upper surface of the base plate 503, by being parallel to the layout plane of the elastic arms 502a,502b and 502c and close to the arms.

Specifically, vertical electrodes provided for the elastic arm 502a are two driving electrodes 504Aa and 504Ab and a drive-sync electrode 504Ba which is located between the electrodes 504Aa and 504Ab for taking the RFE output for synchronous detection of the elastic arm 502a, as shown in FIGS. 26 and 28. Similarly, the elastic arm 502b is provided with two driving electrodes 504Ac and 504Ad and a drive-sync electrode 504Bb which is located between the electrodes 504Ac and 504Ad for taking the RFE output for synchronous detection of the elastic arm 502b, and the elastic arm 502c is provided with two driving electrodes 504Ae and 504Af and a drive-sync electrode 504Bc which is located between the electrodes 504Ae and 504Af for taking the RFE output for synchronous detection of the elastic arm 502c.

Among other vertical electrodes, Coriolis force detecting electrodes 504Cb and 504Cc are laid in the groove 503a by being located between the elastic arms 502a and 502b and between the elastic arms 502b and 502c, respectively, and Coriolis force detecting electrodes 504Ca and 504Cd are laid in the groove 503a by being located on the outer sides of the elastic arms 502a and 502c, respectively. The vertical electrodes of this invention are made of chrome.

The vibrator 501 is adapted to vibrate at its elastic arms 502a, 502b and 502c by being secured at its root section 501a. The vibration of the elastic arms 502a,502b and 502c propagated to the root section 501a is so weak that it does not virtually cause the end of root section 501a to vibrate. According to this invention, the end of root section 501a is joined to the base plate 503 so that it does not affect the vibration of the elastic arms 502a,502b and 502c.

The vibrator 501 can have its Q value, which indicates the degree of resonance, increased by having a narrower gap among the elastic arms 502a,502b and 502c as mentioned previously. The Q value represents the output (vibration amplitude of the elastic arms) with respect to the input, and the greater the Q value, the larger is the resonance amplitude, as shown in FIG. 34. It signifies that a silicon gyroscope, which has a small Q value and necessitates a drive voltage of 100 volts for example, will be able to operate at 15 volts or lower if the Q value is raised. A silicon gyroscope based on a three-arm tuning fork has its Q value raised by narrowing the arm gap, provided that the thickness of substrate is kept constant in both the horizontal and vertical directions.

The silicon gyroscope of this embodiment also can be designed to operate at a lower drive voltage by providing the elastic arms 502a, 502b and 502c with a narrow gap of 30 to 150 μm and using a silicon wafer of 300-μm thickness.

The vibrator 1 can vibrate freely in the vertical and horizontal directions, so that it vibrates without twisting by being driven in the horizontal or vertical direction, allowing the detection of the displacement of vibrator 501 caused by the Coriolis force in the direction orthogonal to the drive direction based on the detection of the component orthogonal to the drive direction.

Figure 29:
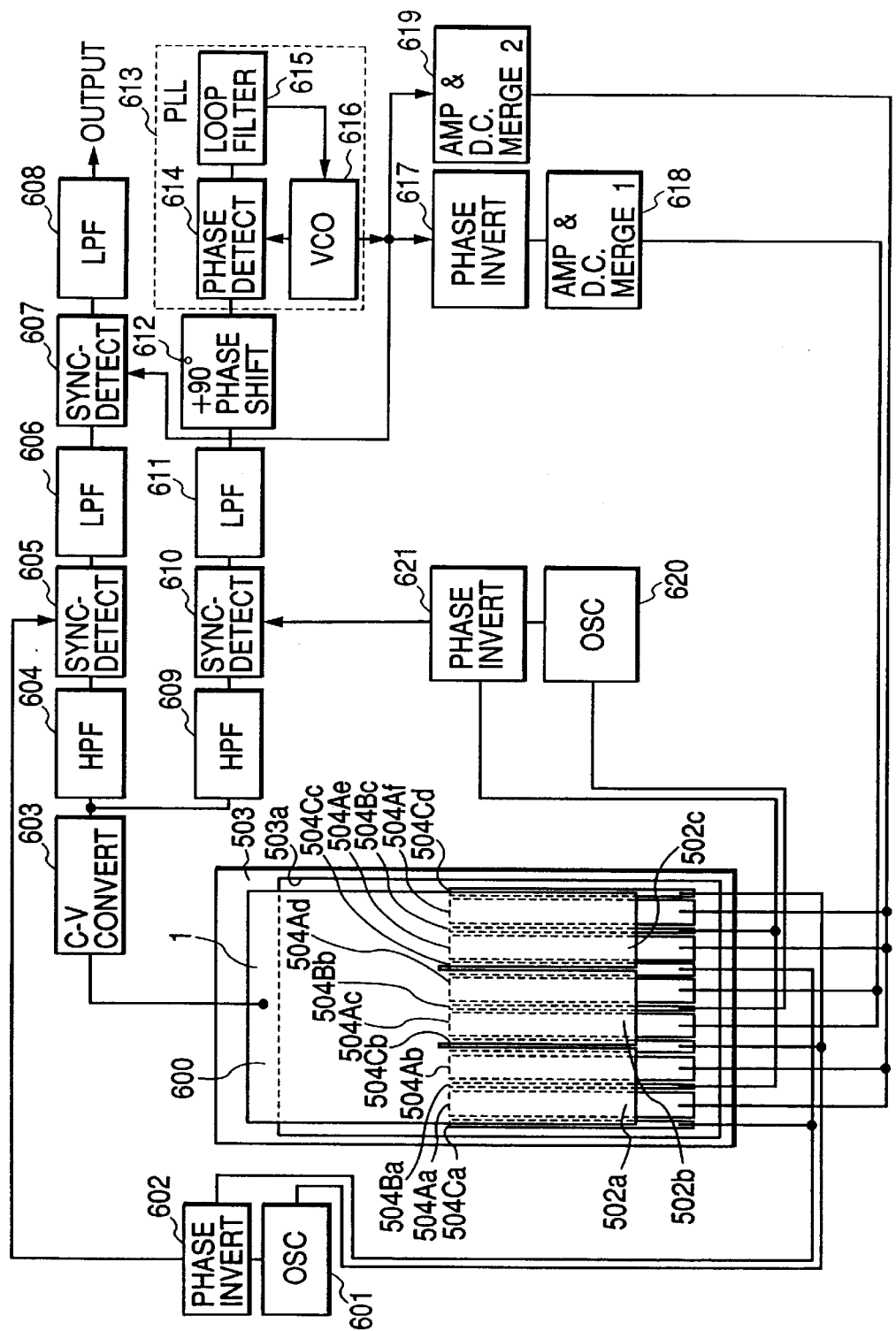
FIG. 29 is a block diagram showing an embodiment of the drive/detect circuit of the silicon gyroscope shown in FIG. 26.

FIG. 29 shows by a block diagram an embodiment of the circuit arrangement for driving and detection of this silicon gyroscope. An oscillation circuit 601 generates an alternating voltage having a frequency of 50 kHz and amplitude of 5 volts, and it is applied to the Coriolis force detecting electrodes 504Cb and 504Cd. A phase inverting circuit 602 produces a carrier wave of opposite phase relative to the voltage provided by the oscillation circuit 601, and the voltage is applied to the Coriolis force detecting electrodes 504Ca and 504Ce.

The Coriolis force detecting electrodes 504C out of the vertical electrodes 504 are spaced out with a gap of 20 μm from the elastic arms 502a,502b and 502c of the vibrator 501, so that a static capacitance emerges across the gaps, which is converted into a voltage value by a C-V conversion circuit 603.

The C-V conversion circuit 603 has its output fed through a HPF 604 having a cutoff frequency of 10 kHz so that the induction noise of 2 kHz caused by electrostatic driving is eliminated. The resulting voltage signal is fed to a synchronous detection circuit 605, which implements the synchronous detection for the signal based on the frequency and phase of the oscillation circuit (oscillator) 601. The detection output is fed through a LPF 606, with its output representing the variation of static capacitance between the Coriolis force detecting electrodes 504C and the three elastic arms 502a, 502b and 502c of the vibrator 501 in their horizontal direction.

The vibrator 501 which is made of low-resistivity silicon is conceived to be electrically conductive for the alternating voltage with respect to the impedance component of the static capacitance between the elastic arms 502a, 502b and 502c of the vibrator 501 and the driving electrodes 504A. Accordingly, the capacitance variations of the three elastic arms 502a, 502b and 502c are coupled at the signal lead-out section 600 and fed by being summed to the C-V conversion circuit 603.

Among the drive-sync electrodes 504B, the electrodes 504Ba and 504Bc that are in jumper connection are connected to a phase inverting circuit 621, and the electrode 504Bb is connected to an oscillation circuit 620 which generates a voltage having a frequency of 70 kHz and amplitude of 5 volts.

Due to the spacing with a 20-μm gap between the drive-sync electrodes 504Ba,504Bb and 504Bc and the three elastic arms 502a,502b and 502c of vibrator 501, there emerge a static capacitance across the gaps, which is converted into a voltage value by the C-V conversion circuit 603.

The C-V conversion circuit 603 has its output fed through a HPF 609 having a cutoff frequency of 10 kHz, and subsequently rendered the synchronous detection by a synchronous detection circuit 610 based on the frequency and phase of the oscillation circuit (oscillator) 620. The detection output is fed through a LPF 611, with its output representing the variation of static capacitance between the drive-sync electrodes 504B and the three elastic arms 502a,502b and 502c of the vibrator 501 in their vertical direction. The driving electrode set 504Ac and 504Ad and the other driving electrode set 504Aa,504Ab,504Ae and 504Af are connected to amplify/d.c. merge circuits 618 and 619, respectively.

The LPF 611 has its output fed through a +90° phase shift circuit 612 and a PLL circuit 613, which is made up of a voltage-controlled oscillator (VCO) 616, a phase detection circuit 614 which compares the vibration phase of the vibrator with the oscillation phase of the VCO 616, and a loop filter 615. The PLL circuit 613 has its output amplified by the amplify/d.c. merge circuits 618 and 619, by which a d.c. voltage is superimposed, and consequently there emerges an electrostatic attraction force between the elastic arms 502a,502b and 502c of the vibrator 501 and the driving electrodes 504A. The driving electrodes 504Ac and 504Ad have the application of the alternating voltage of opposite phase relative to the driving electrodes 504Aa, 504Ab, 504Ae and 504Af provided by a phase inverting circuit 617.

With respect to the output of the amplify/d.c. merge circuit 619 and the input of the C-V conversion circuit 603, i.e., the vibration of vibrator 501 in the vertical direction, the output of the C-V conversion circuit 603 always lags by 90° by the presence of the +90° phase shift circuit 612. That is, the vibration of vibrator 501 in the vertical direction lags by 90°, which phase is kept locked by the PLL circuit 613. Consequently, the vibrator 501 vibrates continuously at its inherent resonant frequency and in a resonant state in the vertical direction (the actual displacement lags by 90° behind the drive phase of the vibrator).

In consequence, the vibration continues in the resonant state, which yields the maximum displacement, even if the resonant frequency inherent to the vibrator 501 varies due to a small variation of its dimensions caused by an external temperature variation. The PLL circuit 613 has its output used for the sync signal of a synchronous detection circuit 607. Accordingly, the circuit 607 detects only the component that is in-phase with the output of the PLL circuit 613 out of the capacitance variation of the vibrator 501 in the horizontal direction, and the detection output is treated by the following LPF 608 to deliver an intended output. In this case, the output phase is locked by the PLL circuit 613 and thus is not disturbed by the operation of the synchronous detection circuit 607, whereby a stable output is obtained.

When the silicon gyroscope is subjected to an angular velocity along the longitudinal direction of the vibrator 501, the Coriolis force acts on the elastic arms 502a, 502b and 502c of vibrator 501 which are vibrating in the vertical direction. For example, when the vibrator 501 is vibrating vertically and is subjected to an angular velocity about its longitudinal axis, the Coriolis force acts on it in the horizontal direction. Therefore, the vibrator 501 has a displacement in the horizontal direction in synchronism with the vertical vibration. The value of displacement is proportional to the exerted angular velocity.

The horizontal displacement of the vibrator 501 is proportional to the variation of static capacitance created in unison with the Coriolis force detecting electrodes 504C. Accordingly, by detecting the static capacitance variation of horizontal direction which is in-phase with the vertical vibration of the vibrator 501, the magnitude of angular velocity and its direction (turning direction) exerted on the silicon gyroscope can be known.

However, the silicon gyroscope of this embodiment, which is intended to narrow the gap among the elastic arms 502a,502b and 502c, does not have in the gaps the provision of horizontal electrodes for detecting the capacitance variation. It is otherwise designed to detect the displacement in the horizontal direction from the variation of coincidence area between the Coriolis force detecting electrodes 504C and the confronting elastic arms 502a,502b and 502c.

The silicon gyroscope of this embodiment has the vertical drive-sync electrodes 504B separately from the driving electrodes 504A. On this account, it does not need to divide voltages by placing voltage dividing resistors on the routes of the oscillation circuit 620, phase inverting circuit 621 and amplify/d.c. voltage merge circuits 618 and 619. Accordingly, the power voltage is utilized effectively, and thus it becomes possible to drive the silicon gyroscope at a lower power voltage.

The drive-sync electrodes 504B release the RFE output for synchronous detection, based on which the displacement in the vertical direction can be detected.

Figure 30:
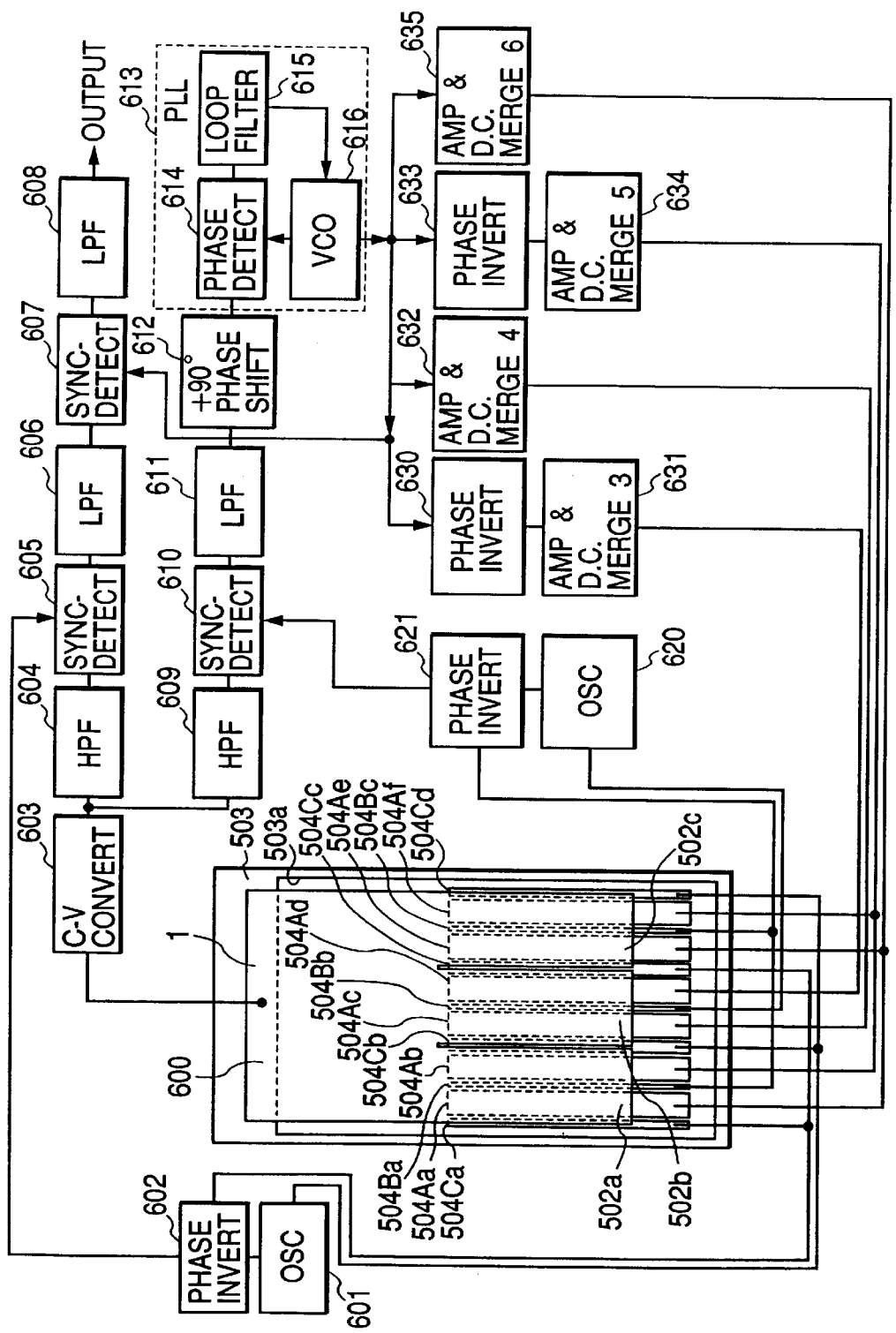
FIG. 30 is a block diagram showing another embodiment of the drive/detect circuit of the silicon gyroscope shown in FIG. 26.

FIG. 30 shows by a block diagram another embodiment of the circuit arrangement for driving and detection of this silicon gyroscope. This circuit arrangement differs from the previous embodiment in that d.c. voltages of opposite polarities are applied to a pair of driving electrodes 504A which correspond to each elastic arm 502.

Among the driving electrodes 504A, the electrode pairs 504Ab and 504Af and 504Aa and 504Ae are connected to the amplify/d.c. voltage merge circuits 634 and 635, respectively, and the electrodes 504Ad and 504Ac are connected to the amplify/d.c. voltage merge circuits 632 and 631, respectively. The LPF 611 has its output fed through the +90° phase shift circuit 612 and the PLL circuit 613, which is made up of a VCO 616, a phase detection circuit 614 which compares the vibration phase of the vibrator with the oscillation phase of the VCO 616, and a loop filter 615, so that there is always a phase difference of +90° between the input and output of the PLL circuit 613, i.e., between the output of the +90° phase shift circuit 612 and the output of the VCO 616. The PLL circuit 613 has its output amplified by the amplify/d.c. merge circuits 631,632, 634 and 635, by which a d.c. voltage is superimposed, and consequently there emerges an electrostatic attraction force between the elastic arms 502a,502b and 502c of the vibrator 501 and the driving electrodes 504Aa, 504Ab, 504Ac, 504Ad, 504Ae and 504Af.

With respect to the outputs of the amplify/d.c. merge circuits 632 and 635 and the input of the C-V conversion circuit 603, i.e., the vibration of vibrator in the vertical direction, the output of the C-V conversion circuit 603 always lags by 90° by the presence of the +90° phase shift circuit 612. That is, the vibration of vibrator 501 in the vertical direction lags by 90°, which phase is kept locked by the PLL circuit 613. Consequently, the vibrator 501 vibrates continuously at its inherent resonant frequency and in a resonant state in the vertical direction (the actual displacement lags by 90° behind the drive phase of the vibrator).

In consequence, the vibration continues in the resonant state, which yields the maximum displacement, even if the resonant frequency inherent to the vibrator 501 varies due to a small variation of its dimensions caused by an external temperature variation. The PLL circuit 613 has its output used for the sync signal of a synchronous detection circuit 607. Accordingly, the circuit 607 detects only the component that is in-phase with the output of the PLL circuit 613 out of the capacitance variation of the vibrator 501 in the vertical direction, and the detection output is treated by the following LPF 608 to deliver an intended output. In this case, the output phase is locked by the PLL circuit 613 and thus is not disturbed by the operation of the synchronous detection circuit 607, whereby a stable output is obtained.

Accordingly, the fourth embodiment is designed to divide the driving electrodes into multiple electrodes (a pair of vertical electrodes for each elastic arm 502 in this embodiment), with a.c. and d.c. voltage components of opposite phases and polarities being applied thereto, so that the influence of drive components on the C-V conversion circuit 603 is reduced. Specifically, for the elastic arm 502a, for example, the a.c. and d.c. components of the driving electrodes 504Aa and 504Ab cancel each other as a result of summation. This fact also holds of the remaining driving electrode pairs 504Ac and 504Ad and 504Ae and 504Af corresponding to the middle and rightmost elastic arms 502b and 502c, respectively.

Based on the dividing of the driving electrodes 504A corresponding to the elastic arms 502a,502b and 502c and application of a.c. voltage components of opposite phases and d.c. voltage components of opposite polarities to the divided electrodes, the electrostatic force comparable to the case of the undivided electrode can be obtained virtually without a loss of electrostatic force per unit area attributable to division, whereby it becomes possible to preclude the induction noise from being fed to the C-V conversion circuit 603.

That is, based on the dividing of the driving electrodes and application of a.c. voltage components of opposite phases and d.c. voltage components of opposite polarities to the divided electrodes so that their influences cancel each other, the induction noise arising on the part of the detecting electrodes is minimized. Based on such rearrangement of electrodes for the same sensing device, it can achieve an enhanced sensitivity of detection and a high s/n ratio. Based on the dividing of the driving electrodes, it becomes possible to produce an electrostatic force comparable to the case of the undivided electrode at the same supply voltage virtually without a loss of electrostatic force to be exerted on the vibrator 501. It achieves the function of driving the vibrator 501 identically to the case of the undivided electrode. Moreover, by finely adjusting the amplitude of the a.c. component which causes the induction noise, the influence cancellation effect can be enhanced.

Figure 31:
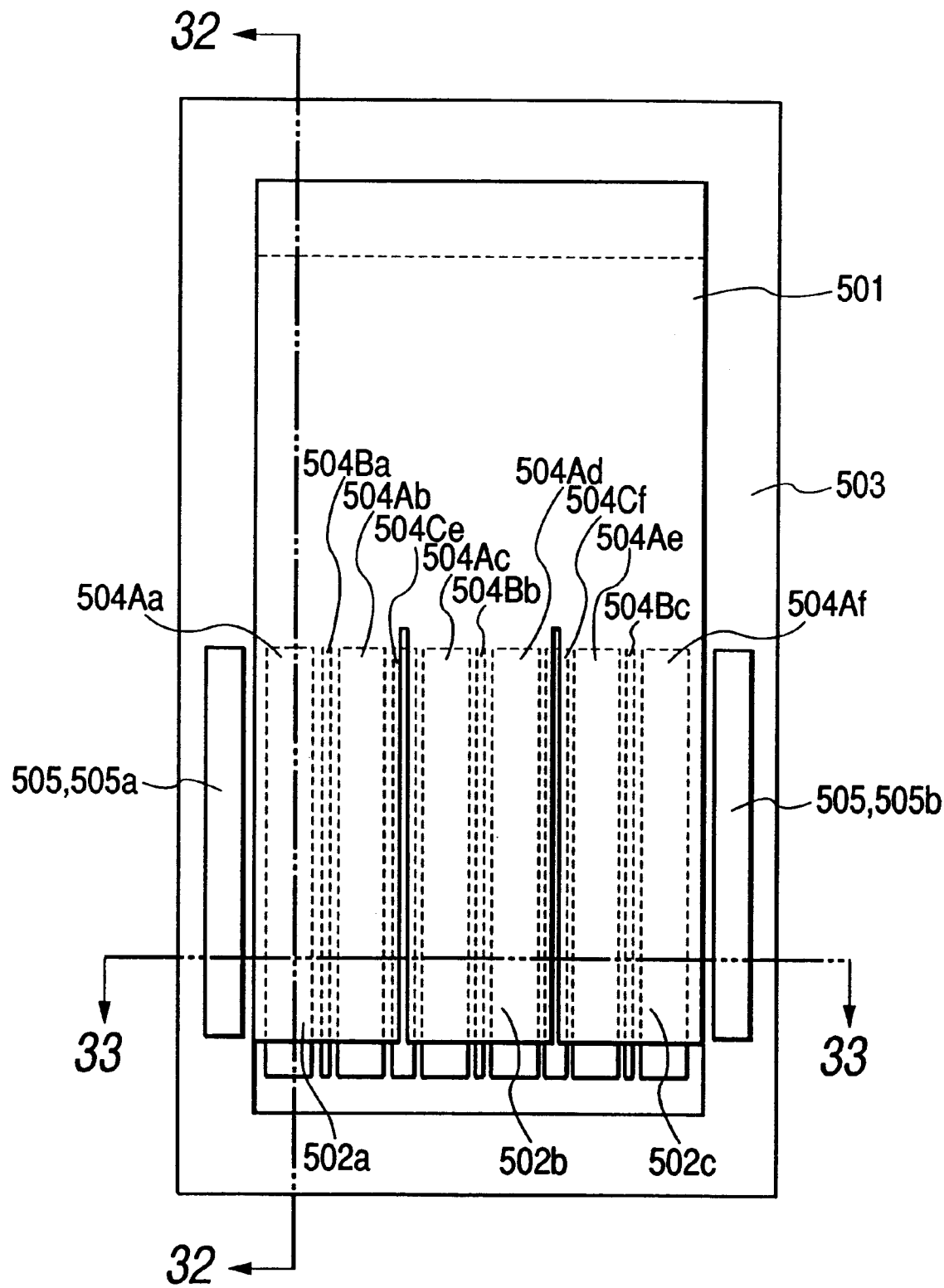
FIG. 31 is a plan view of a silicon gyroscope based on a fourth embodiment of this invention.
Figure 32:
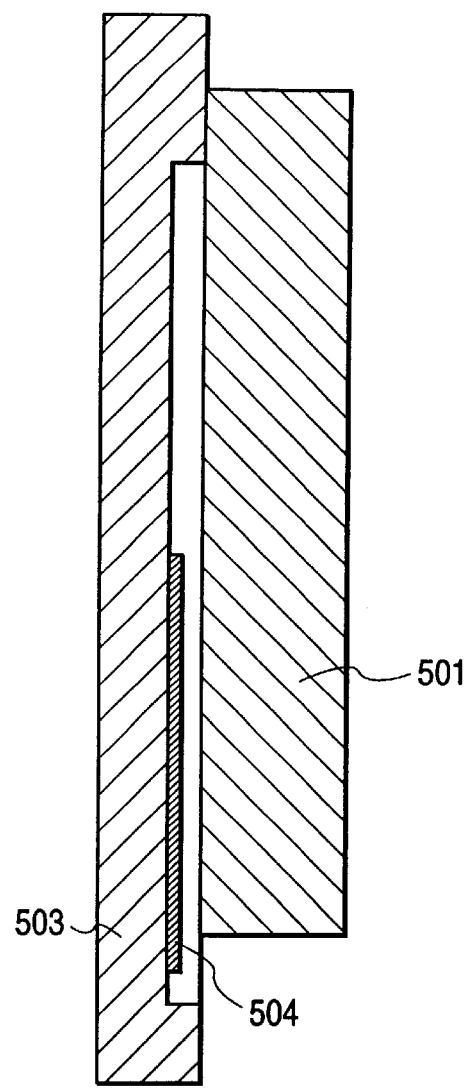
FIG. 32 is a cross-sectional view taken along the line 32—32 of FIG. 31.
Figure 33:
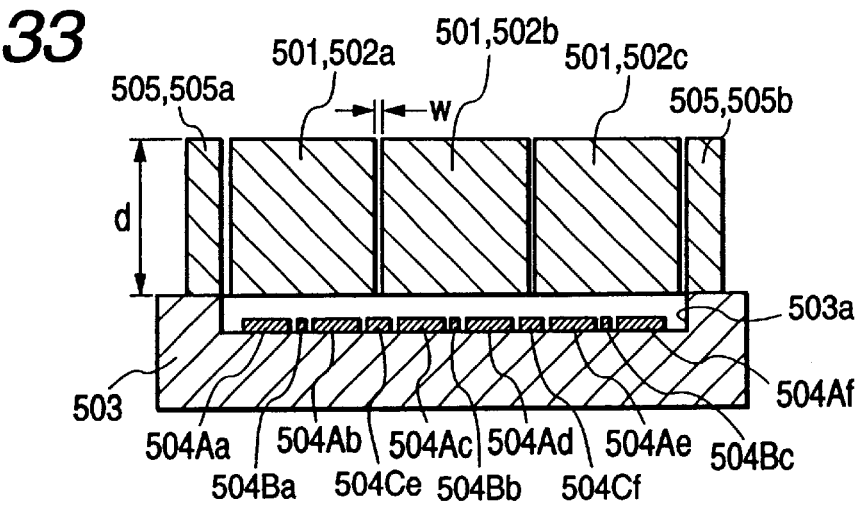
FIG. 33 is a cross-sectional view taken along the line 33—33 of FIG. 31.

FIG. 31 through FIG. 33 show a silicon gyroscope based on the fourth embodiment of this invention, of which FIG. 31 is a plan view of the silicon gyroscope, and FIG. 32 and FIG. 33 are cross-sectional views taken along the line 32—32 and line 33—33, respectively, of FIG. 31.

The main body of silicon gyroscope of this embodiment is also made up of a vibrator 501, a base plate 503, and vertical electrodes 504. The vibrator 501 which is made of silicon consists of a root section 501a and three elastic arms 502a, 502b and 502c which are parallel to each other and separated by two notches running from the root section 501a.

Vertical electrodes provided for the elastic arm 502a are two driving electrodes 504Aa and 504Ab, to which are applied an a.c. and d.c. voltage components of the same amplitudes and opposite phases and polarities, and a drive-sync electrode 504Ba which is located between the electrodes 504Aa and 504Ab for taking the RFE output for synchronous detection of the elastic arm 502a, as shown in FIGS. 31 and 33. Similarly, the elastic arm 502b is provided with two driving electrodes 504Ac and 504Ad having the application of an a.c. and d.c. voltage components of the same amplitudes and opposite phases and polarities and a drive-sync electrode 504Bb which is located between the electrodes 504Ac and 504Ad for taking the RFE output for synchronous detection of the elastic arm 502b, and the elastic arm 502c is provided with two driving electrodes 504Ae and 504Af having the application of an a.c. and d.c. voltage components of the same amplitudes and opposite phases and polarities and a drive-sync electrode 504Bc which is located between the electrodes 504Ae and 504Af for taking the RFE output for synchronous detection of the elastic arm 502c.

Among other vertical electrodes, Coriolis force detecting electrodes 504Ce and 504Cf are laid in the groove 503a by being located between the elastic arms 502a and 502b and between the elastic arms 502b and 502c, respectively, and, different from the silicon gyroscope of the previous third embodiment, horizontal electrodes 505a and 505b are laid on the outer sides of the elastic arms 502a and 502c by being orthogonal to the arm layout plane and close to the arms 502a and 502c. The remaining structure of the gyroscope main body is identical to the silicon gyroscope of the previous third embodiment.

The silicon gyroscope of this embodiment arranged as explained above has basically the same operational characteristics and effectiveness as those of the previous embodiment. In addition, it facilitates the performance test at mass production, in which the resonant frequency in the horizontal direction is measured by driving the vibrator 501 horizontally.

As described above, the inventive silicon gyroscope having its vibrator made of monocrystal silicon detects the angular velocity accurately and stably in the environment of varying temperature and throughout the long-term use, and enables the fabricating process for large-scale production. Owing to the absence of attached members on the elastic arms, the vibrator can vibrate stably without their influence.

Driving of the vibrator and detection of Coriolis force are implemented in non-contact fashion against the vibrator, so that the detection of Coriolis force is virtually rid of error factors. The orthogonality between the drive vibration and the vibration of detection is accurate based on the photo-lithographic processing of the silicon vibrator, so that the influence of the drive signal on the detection signal can be prevented.

By narrowing the gap between elastic arms, the inventive silicon gyroscope has enhanced sensitivity of Coriolis force detection without the need of supply of a high drive voltage.

What is claimed is:

1. A silicon gyroscope comprising a vibrator, a base plate, horizontal electrodes, and vertical electrodes, said vibrator being made from a single crystal silicon and having a base portion, with three elastic arms extending from said base portion and separated by two notches, and said base plate being formed from glass, wherein:

part of a root section of the base portion of said vibrator is fixed to said base plate;

said horizontal electrodes are formed of a silicon wafer, and are disposed between said elastic arms and on outer sides of said elastic, said horizontal electrodes being orthogonal to a plane formed by the layout of said elastic arms and positioned adjacent to said elastic arms in such a manner that part of said horizontal electrodes contact said base plate;

said vertical electrodes are formed of a metallic film, and include two electrodes which are disposed in a groove formed on an upper surface of said base plate and to which alternating voltages having phases inverted to each other are applicable by being parallel to the layout plane of the elastic arms and adjacent to said elastic arms; and said horizontal electrodes and said vertical electrodes being disposed in directions orthogonal to each other.

2. A silicon gyroscope comprising a vibrator which is made from a silicon wafer and having three elastic arms separated by two notches, with part of a root section of the vibrator supporting said elastic arms being fixed to a base plate; and vertical electrodes which are laid in correspondence to said elastic arms by being parallel to a plane formed by the layout of said elastic arms and disposed adjacent to said elastic arms, wherein said elastic arms are dimensioned to have a thickness d and a notch width W related in terms of the value of W/d to be in the range from 1 to 0.02, wherein said vertical electrodes comprise driving electrodes, Coriolis force detecting electrodes, and drive synchronous electrodes for detecting the Coriolis force in the vertical direction, said driving electrodes being located in pairs to confront each of said elastic arms, said Coriolis force detecting electrodes being located to confront each of said notches and outer sides of said elastic arms, and said drive synchronous electrodes being located between each of said pair of driving electrodes.

3. A silicon gyroscope according to claim 2 further including horizontal electrodes which are positioned adjacent to the outer sides of said elastic arms by being orthogonal to the plane formed by the layout of said elastic arms.

4. A method of driving a silicon gyroscope, said silicon gyroscope comprising a vibrator which is made from a silicon wafer and has three elastic arms separated by two notches, with part of a root section of the vibrator supporting said elastic arms being fixed to a base plate, and vertical electrodes which are laid in correspondence to said elastic arms by being parallel to a plane formed by the layout of said elastic arms and disposed adjacent to said elastic arms, said vertical electrodes comprising driving electrodes, Coriolis force detecting electrodes, and drive synchronous electrodes for detecting the Coriolis force in the vertical direction, said driving electrodes being located in pairs to confront each of said elastic arms, said Coriolis force detecting electrodes being located to confront each of said notches and outer sides of said elastic arms, and said drive synchronous electrodes being located between each of said pair of driving electrodes, wherein said method comprises applying voltages consisting of d.c. components of opposite polarities and a.c. components of opposite phases to each said pair of driving electrodes.

* * * * *

UNITED STATES PATENT AND TRADEMARK OFFICE
CERTIFICATE OF CORRECTION

PATENT NO. : 6,257,058 B1
DATED : July 10, 2001
INVENTOR(S) : Shinji Murata

It is certified that error appears in the above-identified patent and that said Letters Patent is hereby corrected as shown below:

<u>Column 20,</u>
Line 65, after "elastic" and before "," (comma) insert -- arms --.

Signed and Sealed this

Fourteenth Day of May, 2002

Attest:

Attesting Officer

JAMES E. ROGAN
*Director of the United States Patent and Trademark Office*